(12) United States Patent
Salem

(10) Patent No.: US 12,009,956 B2
(45) Date of Patent: *Jun. 11, 2024

(54) SYSTEMS AND METHODS FOR TRANSMISSION OF UPLINK CONTROL INFORMATION OVER MULTIPLE CARRIERS IN UNLICENSED SPECTRUM

(71) Applicant: Huawei Technologies Co., Ltd., Shenzhen (CN)

(72) Inventor: Mohamed Adel Salem, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,285

(22) Filed: Jan. 13, 2023

(65) Prior Publication Data

US 2023/0155871 A1 May 18, 2023

Related U.S. Application Data

(63) Continuation of application No. 16/797,907, filed on Feb. 21, 2020, now Pat. No. 11,582,077.
(Continued)

(51) Int. Cl.
*H04L 27/26* (2006.01)
*H04L 1/1812* (2023.01)
(Continued)

(52) U.S. Cl.
CPC ........ *H04L 27/2602* (2013.01); *H04L 1/1812* (2013.01); *H04L 27/2607* (2013.01);
(Continued)

(58) Field of Classification Search
CPC ............. H04L 1/1812; H04L 27/2607; H04W 72/0413; H04W 72/042; H04W 74/0808
See application file for complete search history.

(56) References Cited

U.S. PATENT DOCUMENTS 10,009,920 B2 6/2018 Rico Alvarino et al.
10,045,339 B2 8/2018 Wei et al.
(Continued)

FOREIGN PATENT DOCUMENTS

BR 112020009633 A2 11/2020
CA 3110756 A1 * 8/2021 ........... H04L 1/1671
(Continued)

OTHER PUBLICATIONS

"3rd Generation Partnership Project; Technical Specification Group Radio Access Network; Physical layer procedures for shard spectrum channel access (Release 15", 3GPP TS 37.213, V15.1.0, Technical Specification, Sep. 2018, 20 Pages.
(Continued)

*Primary Examiner* — Eric Nowlin
(74) *Attorney, Agent, or Firm* — Slater Matsil, LLP

(57) ABSTRACT

Wireless communication between a user equipment (UE) and a base station may occur on unlicensed spectrum. When wirelessly communicating on unlicensed spectrum, there is an expectation that there may be interference from others devices also transmitting on the same resources in the unlicensed spectrum. Systems and methods are therefore disclosed that aim to facilitate wireless communication in unlicensed spectrum. In some embodiments, systems and method are disclosed that are directed to the transmission of uplink control information (UCI) in unlicensed spectrum. The UCI may be or include hybrid automatic repeat request (HARQ) feedback. The HARQ feedback may correspond to a downlink data transmission that was also sent on unlicensed spectrum.

24 Claims, 17 Drawing Sheets

Related U.S. Application Data

(60) Provisional application No. 62/810,057, filed on Feb. 25, 2019.

(51) Int. Cl.
  *H04W 72/21* (2023.01)
  *H04W 72/23* (2023.01)
  *H04W 74/0808* (2024.01)

(52) U.S. Cl.
  CPC ........... *H04W 72/21* (2023.01); *H04W 72/23* (2023.01); *H04W 74/0808* (2013.01)

(56) References Cited

U.S. PATENT DOCUMENTS

| | | | |
|---|---|---|---|
| 10,187,191 B2* | 1/2019 | Chen | H04W 52/0219 |
| 10,284,351 B2* | 5/2019 | Ahn | H04L 5/0055 |
| 10,420,144 B2 | 9/2019 | Kusashima et al. | |
| 10,498,576 B2 | 12/2019 | Baldemair et al. | |
| 10,568,041 B2 | 2/2020 | MolavianJazi et al. | |
| 10,587,387 B2* | 3/2020 | Ahn | H04L 1/18 |
| 10,660,044 B2 | 5/2020 | Molavian Jazi et al. | |
| 10,727,988 B2 | 7/2020 | Bergström et al. | |
| 10,779,310 B2 | 9/2020 | Wang et al. | |
| 10,784,996 B2 | 9/2020 | Hooli et al. | |
| 10,856,289 B2 | 12/2020 | Zheng et al. | |
| 10,862,654 B2* | 12/2020 | Ahn | H04L 5/00 |
| 10,951,366 B2* | 3/2021 | Yang | H04W 76/15 |
| 11,051,325 B2 | 6/2021 | Wang et al. | |
| 11,121,891 B2 | 9/2021 | Kim et al. | |
| 11,368,255 B2* | 6/2022 | Zhu | H04W 74/0808 |
| 11,395,344 B2 | 7/2022 | Yoon et al. | |
| 11,510,186 B2* | 11/2022 | Shi | H04B 1/713 |
| 11,582,077 B2* | 2/2023 | Salem | H04W 72/21 |
| 11,622,374 B2* | 4/2023 | Yi | H04W 72/23 |
| | | | 370/254 |
| 11,627,600 B2* | 4/2023 | Yi | H04W 76/11 |
| | | | 370/254 |
| 11,737,107 B2* | 8/2023 | Yi | H04W 72/0466 |
| | | | 370/329 |
| 2015/0063140 A1 | 3/2015 | Yi et al. | |
| 2017/0164352 A1* | 6/2017 | Yang | H04W 72/21 |
| 2017/0208582 A1* | 7/2017 | Liang | H04W 28/18 |
| 2017/0215198 A1* | 7/2017 | Chen | H04L 5/005 |
| 2017/0244586 A1 | 8/2017 | Yoo et al. | |
| 2017/0280475 A1 | 9/2017 | Yerramalli et al. | |
| 2018/0084540 A1* | 3/2018 | Takeda | H04L 5/0044 |
| 2018/0139082 A1 | 5/2018 | Chen et al. | |
| 2018/0160400 A1 | 6/2018 | Liu et al. | |
| 2018/0175973 A1* | 6/2018 | Rosa | H04L 5/0055 |
| 2018/0220462 A1* | 8/2018 | Kusashima | H04W 74/0816 |
| 2018/0278398 A1* | 9/2018 | Ahn | H04L 1/1671 |
| 2018/0295005 A1 | 10/2018 | Baldemair et al. | |
| 2018/0338318 A1 | 11/2018 | Yum et al. | |
| 2018/0352527 A1 | 12/2018 | Wang et al. | |
| 2018/0367282 A1 | 12/2018 | Li et al. | |
| 2019/0037565 A1 | 1/2019 | Zheng et al. | |
| 2019/0053265 A1 | 2/2019 | Kim et al. | |
| 2019/0074935 A1 | 3/2019 | Babaei et al. | |
| 2019/0150169 A1 | 5/2019 | Wang et al. | |
| 2019/0159135 A1 | 5/2019 | MolavianJazi et al. | |
| 2019/0159136 A1 | 5/2019 | MolavianJazi et al. | |
| 2019/0222397 A1* | 7/2019 | Ahn | H04L 5/00 |
| 2019/0253200 A1 | 8/2019 | Salem et al. | |
| 2019/0260523 A1* | 8/2019 | Yang | H04L 5/001 |
| 2019/0327765 A1 | 10/2019 | Mukherjee et al. | |
| 2020/0059327 A1 | 2/2020 | Kini et al. | |
| 2020/0107317 A1 | 4/2020 | Ryu et al. | |
| 2020/0169373 A1* | 5/2020 | Ahn | H04W 72/04 |
| 2020/0196343 A1* | 6/2020 | Marinier | H04L 1/1896 |
| 2020/0213042 A1* | 7/2020 | Zhu | H04W 76/27 |
| 2020/0213043 A1 | 7/2020 | Hooli et al. | |
| 2020/0235891 A1 | 7/2020 | Lei et al. | |
| 2020/0275437 A1* | 8/2020 | Shi | H04L 5/0053 |
| 2020/0280465 A1 | 9/2020 | Kim et al. | |
| 2020/0322979 A1 | 10/2020 | Chatterjee et al. | |
| 2020/0383131 A1 | 12/2020 | Wang et al. | |
| 2021/0068135 A1 | 3/2021 | Shah et al. | |
| 2021/0092763 A1* | 3/2021 | Li | H04W 72/21 |
| 2021/0105102 A1 | 4/2021 | Li et al. | |
| 2021/0105812 A1 | 4/2021 | Rastegardoost et al. | |
| 2021/0135803 A1 | 5/2021 | Chang et al. | |
| 2021/0136791 A1* | 5/2021 | Akkarakaran | H04W 72/569 |
| 2021/0185722 A1 | 6/2021 | Li et al. | |
| 2021/0274476 A1* | 9/2021 | Yi | H04W 48/12 |
| 2021/0274477 A1* | 9/2021 | Yi | H04W 76/27 |
| 2021/0274535 A1* | 9/2021 | Yi | H04L 5/0032 |
| 2021/0321392 A1* | 10/2021 | Hooli | H04L 5/0053 |
| 2021/0329676 A1 | 10/2021 | Yang et al. | |
| 2021/0376963 A1 | 12/2021 | Liang et al. | |
| 2021/0392685 A1 | 12/2021 | Myung et al. | |
| 2022/0272750 A1 | 8/2022 | Chisci et al. | |
| 2023/0300848 A1* | 9/2023 | Yi | H04L 1/1851 |
| | | | 370/254 |
| 2023/0328747 A1* | 10/2023 | Yi | H04W 24/08 |
| | | | 370/254 |

FOREIGN PATENT DOCUMENTS

| | | | | |
|---|---|---|---|---|
| CN | 106658742 A | | 5/2017 | |
| CN | 107396386 A | | 11/2017 | |
| CN | 107771400 A | | 3/2018 | |
| CN | 109803407 A | * | 5/2019 | ............. H04B 1/713 |
| CN | 111434174 A | | 7/2020 | |
| CN | 112335323 A | | 2/2021 | |
| CN | 109803407 B | * | 4/2022 | ............. H04B 1/713 |
| EP | 3163957 A1 | * | 5/2017 | ........... H04L 5/0055 |
| EP | 3163957 B1 | * | 9/2018 | ........... H04L 5/0055 |
| EP | 3629662 A1 | | 4/2020 | |
| EP | 3709706 A1 | * | 9/2020 | ............. H04B 1/713 |
| EP | 3711421 A2 | | 9/2020 | |
| EP | 3709706 A4 | * | 1/2021 | ............. H04B 1/713 |
| EP | 3888408 A1 | | 10/2021 | |
| EP | 3709706 B1 | * | 11/2022 | ............. H04B 1/713 |
| JP | 2021503843 A | * | 2/2021 | |
| JP | 2022517198 A | | 3/2022 | |
| KR | 20200083486 A | | 7/2020 | |
| KR | 102181251 B1 | | 11/2020 | |
| WO | WO-2016000368 A1 | * | 1/2016 | ........... H04L 5/0055 |
| WO | WO-2017052251 A1 | * | 3/2017 | ........... H04L 1/1671 |
| WO | 2017131465 A1 | | 8/2017 | |
| WO | 2017207614 A1 | | 12/2017 | |
| WO | 2017214621 A1 | | 12/2017 | |
| WO | 2018030493 A1 | | 2/2018 | |
| WO | 2018030744 A1 | | 2/2018 | |
| WO | 2018034485 A1 | | 2/2018 | |
| WO | 2019099518 A2 | | 5/2019 | |
| WO | 2019099518 A3 | | 5/2019 | |
| WO | WO-2019095834 A1 | * | 5/2019 | ............. H04B 1/713 |
| WO | 2020046311 A1 | | 4/2020 | |
| WO | 2020144399 A1 | | 7/2020 | |
| WO | 2020167105 A1 | | 8/2020 | |
| WO | 2020201118 A1 | | 10/2020 | |
| WO | WO-2021174084 A1 | * | 9/2021 | ........... H04L 1/1671 |

OTHER PUBLICATIONS

"3rd Generation Partnership Project; Technical Specification Group Radio Access Network; NR; Physical layer procedures for control (Release 15)", 3GPP TS 38.213, V15.4.0, Technical Specification, Dec. 2018, 104 Pages.

"3rd Generation Partnership Project; Technical Specification Group Radio Access Network; NR; Medium Access Control (MAC) protocol specification (Release 15)", 3GPP TS 38.321, V15.4.0, Technical Specification, Dec. 2018, 77 Pages.

Convida Wireless, "Potential Enhancements to Configured Grants", 3GPP TSG-RAN WG1 Meeting #94bis, R1-1811626, Oct. 8-12, 2018, 5 Pages, Chengdu, China.

Ericsson, "Potential enhancements to configured grants", P TSG-RAN WG1 Meeting #94, R1-1811304, Oct. 8-12, 2018, 5 Pages, Chengdu, China.

(56) References Cited

OTHER PUBLICATIONS

Ericsson, "Configured UL grant for NR-U", 3GPP TSG-RAN WG1 Meeting Ad Hoc 1901, R1-1901001, Jan. 21-25, 2019, 4 Pages, Taipei, Taiwan.
Ericsson, "Potential HARQ enchancements for NR-U", 3GPP TSG-RAN WG1 Meeting Ad Hoc 1901, R1-1901000, Jan. 21-25, 2019, 6 Pages, Taipei, Taiwan.
ETRI, "Remaining issues about PUCCH regarding UCI multiplexing", 3GPP TSG RAN WG1 Meeting 94bis, R1-1810948, Oct. 8-12, 2018, 2 Pages, Chengdu, China.
Huawei, et al., "Transmission with configured grant in NR unlicensed band", 3GPP TSG RAN WG1 Meeting #95, R1-1812197, Nov. 12-16, 2018, 9 Pages, Spokane, USA.
Huawei, et al., "Coexistence and channel access for NR unlicensed band operations", 3GPP TSG RAN WG1 Meeting #96, R1-1901525, Feb. 25-Mar. 1, 2019, 22 Pages, Athens, Greece.
Huawei, et al., "Transmission with configured grant in NR unlicensed band", 3GPP TSG RAN WG1 Meeting #94, R1-1808064, Aug. 20-24, 2018, 7 Pages, Gothenburg, Sweden.
Huawei, et al., "Transmission with configured grant in NR unlicensed band", 3GPP TSG RAN WG1 Meeting #94bis, R1-1810129, Oct. 8-Oct. 12, 2018, 9 Pages, Chengdu, China.
Institute for Infomration Industry (III), "Discussion on Configured Grant Enahncements", 3GPP TSG WG1 Meeting #94bis, R1-1811552, Oct. 8-12, 2018, 4 Pages, Chengu, China.
Intel Corporation, "Enhancements to configured grants for NR-unlicenses", 3GPP TSG RAN WG1 Meeting #95, R1-1812485, Nov. 12-16, 2018, 4 Pages, Spokane, USA.
Intel Corporation, "Summary of offline discussions configured grants for NR-U", 3GPP TSG RAN WG1 Meeting #95, R1-1814121, Nov. 12-16, 2018, 14 Pages, Spokane, USA.
Interdigital Inc., "Configured Grant Enhancements in NR-U", 3GPP TSG RAN WG1 Meeting #94bis, R1-1811207, Oct. 8-12, 2018, 5 Pages, Chengdu, China.
LG Electronics, "Discussion on configured grant for NR unlicensed opertaion", 3GPP TSG RAN WG1 Meeting #95, R1-1812563, Nov. 12-16, 2018, 5 Pages, Spokane, US.
LG Electronics, "Discussion on configured grant for NR unlicensed operation", 3GPP TSG RAN WG1 Meeting #94bis, R1-1810272, Oct. 8-12, 2018, 5 Pages, Chengdu, China.
LG Electronics, "HARQ procedure for NR-U", 3GPP TSG RAN WG1 #96, R1-1902042, Feb. 25-Mar. 1, 2019, 11 Pages, Athens, Greece.
LG Electronics, "HARQ procedure for NR-U", 3GPP TSG RAN WG1 #96, R1-1902042, Feb. 25-Mar. 1, 2019, 10 Pages, Athens, Greece.
Mediatek Inc., "Enhancements to HARQ for NR-U operation", 3GPP TSG RAN WG1 #96, R1-1901800, Feb. 25-Mar. 1, 2019, 14 Pages, Athens, Greece.
Mediatek Inc., "Discussion on NR-U configured grant", 3GPP TSG RAN WG1 Meeiting #95, 1-1812359, Nov. 12-16, 2018, 3 Pages, Spokane, USA.
Nokia, et al., "Feature Lead's Summary on Channel Access Procedures", 3GPP TSG RAN WG1 Meeting #99, R1-1912258, Nov. 18-22, 2019, 26 Pages, Reno, US.
NTT Docomo, Inc., "HARQ enhancement for NR-U", 3GPP TG RAN WG1 #96, R1-1902791, Feb. 25-Mar. 1, 2019, 6 Pages, Athens, Greece.
NTT Docomo, Inc., "Enhancements to configured grants for NR-U operation", 3GPP TSG RAN WG1 Meeting #94bis, R1-1811371, Oct. 8-12, 2018, 2 Pages, Chengdu, China.
Qualcomm Incorporated, "Enhancements to Scheduling and HARQ operation for NR-U", 3GPP TSG RAN WG1 Meeting #96, R1-1902987, Feb. 25-Mar. 1, 2019, 12 Pages, Athens, Greece.
Qualcomm Incorporated, "Enhancement to configured grants in NR unlicensed", 3GPP TSG RAN WG1 Meeting #94bis, R1-1811255, Oct. 6-Oct. 12, 2018, 7 Pages, Chengdu, China.
Samsung, "HARQ enchancements for NR-U", 3GPP TSG RAN WG1 Ad-Hoc meeting 1901, R1-1901033, Jan. 21-25, 2019, 10 Pages, Taipei, Taiwan.
Samsung, "Discussion on shared MCOT and LBT procedure", 3GPP T SG RAN WG1 #85, R1-164752, Mat 23-27, 2016, 4 Pages, Nanjing, China.
Spreadtrum Communications, "Discussion on HARQ enhancements in NR-U", 3GPP TSG RAN WG1 Ad-Hoc Meeting 1901, R1-1900706, Jan. 21-25, 2019, Taipei.
Spreadtrum Communications, "Discussion on configured grant transmission in NR-U operation", 3GPP TSG RAN WG1 Ad-Hoc Meeting 1901, R1-1900717, Jan. 21-25, 2019, 3 Pages, Taipei.
Spreadtrum Communications, "Consideration on configured grant transmission in NR-U operation", 3GPP TSG RAN WG1 Meeting #94bis, R1-1811018, Oct 8-Oct. 12, 2018, 4 Pages, Chengdu, China.
TCL Communications, "Discussion on COT sharing for configured grants", 3GPP TSG RAN WG1 Meeting #94bis, R1-1811082, Oct. 8-12, 2018, 4 Pages, Chengdu, China.
VIVO, "Discussion on the enhancements to configured grants", 3GPP TSG RAN WG1 Meeting #95, R1-1812303, Nov. 12-16, 2018, 6 pages, Spokane, US.
VIVO, "Discussion on physical DL channel design in unlicensed spectrum", 3GPP TSG RAN WG1 #92bis, R1-1910202, Oct. 14-20, 2019, 11 Pages, Chongqing, China.
VIVO, "Discussion on the channel access procedures", 3GPP TSG RAN WG1#96, R1-1901675, Feb. 25-Mar. 1, 2019, 10 Pages, Athens, Greece.
Xiaomi, "HARQ enhancement for NR-U", 3GPP TSG RAN WG1 Ad-Hoc Meeting 1901, R1-1901101, Jan. 21-25, 2019, 4 Pages, Taipei.
ZTE, "Discussion on configured grant for NR-U", 3GPP TSG RAN WG1 Meeiting #95, R1-1812438, Nov. 12-16, 2018, 5 Pages, Spokane, USA.

\* cited by examiner

SYSTEMS AND METHODS FOR TRANSMISSION OF UPLINK CONTROL INFORMATION OVER MULTIPLE CARRIERS IN UNLICENSED SPECTRUM

CROSS-REFERENCE TO RELATED APPLICATIONS

This application is a continuation of U.S. patent application Ser. No. 16/797,907 filed on Feb. 21, 2020, now U.S. patent Ser. No. 15,820,77 issued on Feb. 14, 2023, entitled "Systems and Methods for Transmission of Uplink Control Information over Multiple Carriers in Unlicensed Spectrum," which claims the benefit under 35 U.S.C § 119(e) of U.S. Provisional Patent Application Ser. No. 62/810,057, entitled "Systems and Methods for Transmission of Uplink Control Information over Multiple Carriers in Unlicensed Spectrum", which was filed on Feb. 25, 2019, applications of which are incorporated herein by reference.

TECHNICAL FIELD

The present application relates to wireless communication in unlicensed spectrum, and more particularly to transmission of uplink control information (UCI) over multiple carriers in unlicensed spectrum.

BACKGROUND

In some wireless communication systems, user equipments (UEs) wirelessly communicate with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a base station may wirelessly transmit data, such as a transport block (TB), to a UE in a downlink transmission at a particular frequency and over a particular duration of time. The frequency and time duration used are examples of resources.

Wireless communication between a UE and a base station may occur on licensed spectrum, on unlicensed spectrum, or on both. Licensed spectrum refers to frequency bands that are licensed for use for wireless communications. A company licensing a particular frequency band has the right to wirelessly communicate using that frequency band in a given geographic area. Unlicensed spectrum refers to frequency bands that are not licensed for use for wireless communications, and that are free to use by anybody in compliance with the regional spectrum regulations. Therefore, the unlicensed spectrum is a shared spectrum. When wirelessly communicating on unlicensed spectrum, there is an expectation that there may be interference from other devices also transmitting on the same resources in the unlicensed spectrum. Therefore, a device operating on unlicensed spectrum, i.e., operating with shared spectrum access, may use a listen before talk (LBT) protocol in which the device first listens to the wireless channel to determine the availability of the channel before sending a transmission. LBT is thus a channel access procedure.

It is desired to provide systems and methods that improve the reliability of wireless communication, and particularly uplink wireless communication, in unlicensed spectrum. Improving the reliability of wireless communication in unlicensed spectrum may better allow for mobile operators to at least partially offload their continuously increasing traffic load to the available unlicensed spectrum resources, e.g. using a unified/integrated carrier-type air interface.

SUMMARY

Systems and methods are disclosed that aim to facilitate wireless communication in unlicensed spectrum. In some embodiments, systems and method are disclosed that are directed to the transmission of uplink control information (UCI) in unlicensed spectrum. The UCI may be or include hybrid automatic repeat request (HARQ) feedback. The HARQ feedback may correspond to a downlink data transmission that was also sent on unlicensed spectrum. In some embodiments, multiple uplink resource partitions are allocated across different component carriers (CCs), and the UCI may possibly be sent on one or more of the allocated uplink resource partitions. An allocated uplink resource partition consists of at least an allocated uplink time-frequency resource partition, and possibly other resource parameters. A physical uplink control channel (PUCCH) allocated by a base station is an example of an allocated uplink resource partition.

By allocating different uplink resource partitions across different CCs, the systems and methods of some embodiments may provide more reliable uplink transmission in unlicensed spectrum. In particular, if the UCI cannot be transmitted on an allocated uplink resource partition on one CC, e.g. because the wireless channel is occupied, then it may be possible to instead transmit the UCI on an uplink resource partition allocated on another CC.

In some embodiments, there is provided a method performed by a UE that includes: receiving downlink control information (DCI) that indicates (i) an uplink resource partition in unlicensed spectrum on which UCI may be sent, and (ii) a LBT type to be used in association with the uplink resource partition. The method may further include performing the LBT type indicated in the DCI. The method may further include transmitting the UCI on the uplink resource partition. A UE configured to perform the UE methods is also provided.

BRIEF DESCRIPTION OF THE DRAWINGS

Embodiments will be described, by way of example only, with reference to the accompanying figures wherein.

DETAILED DESCRIPTION OF ILLUSTRATIVE EMBODIMENTS

For illustrative purposes, specific example embodiments will now be explained in greater detail below in conjunction with the figures.

Example Communication Systems and Devices

Figure 1:
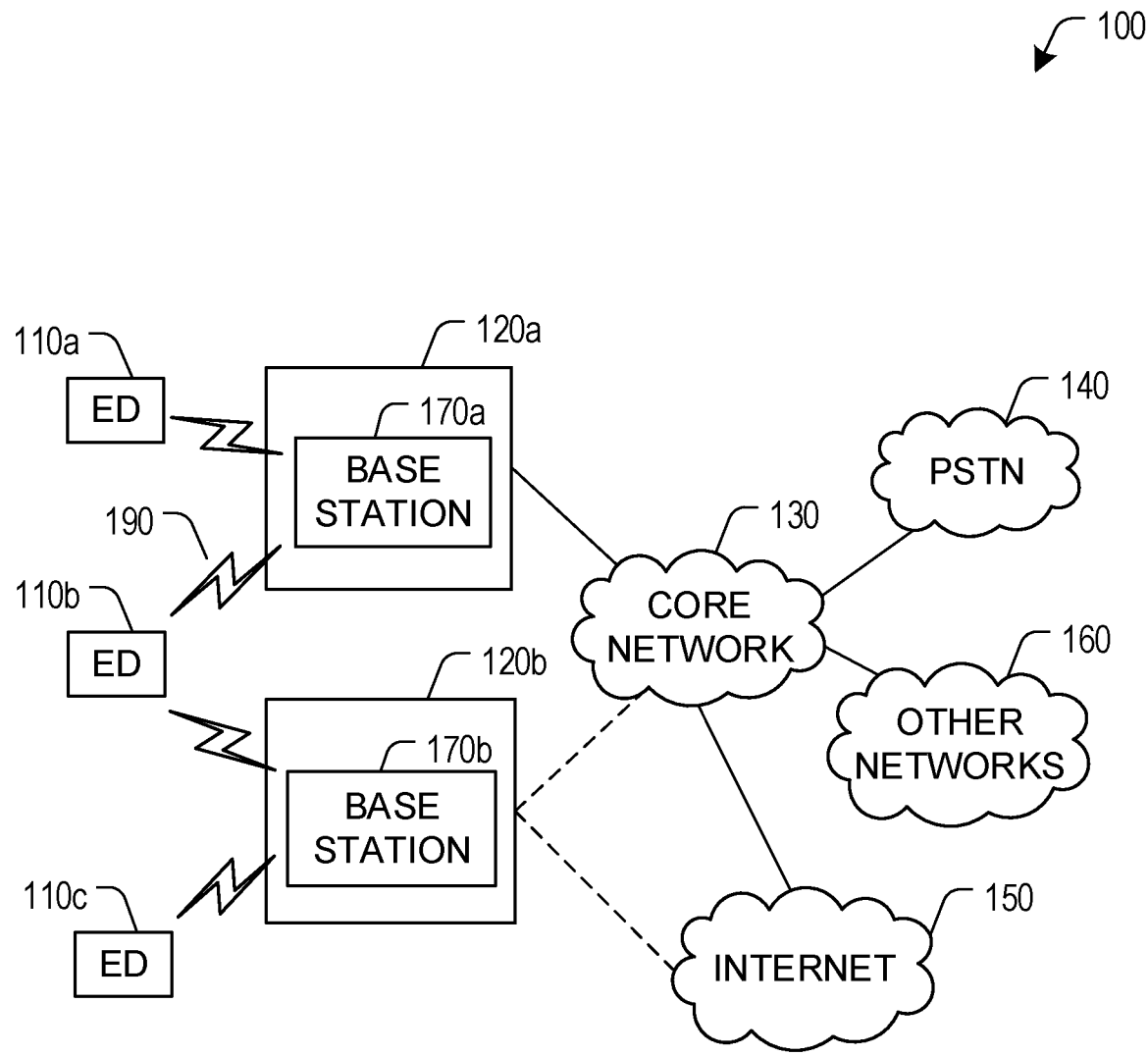
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet iso, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
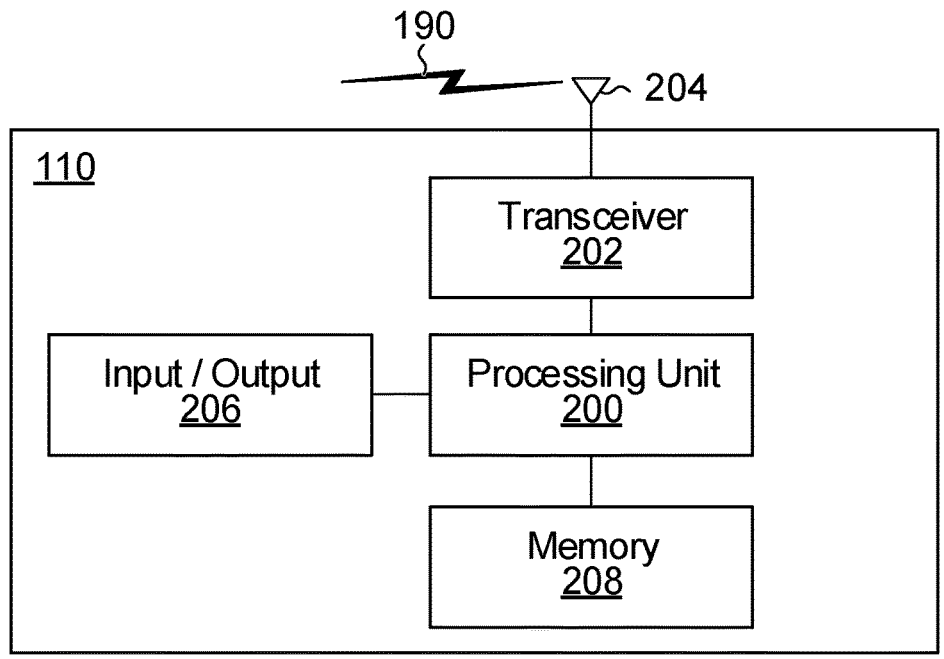
FIG. 2 is a block diagram of an example electronic device.
Figure 3:
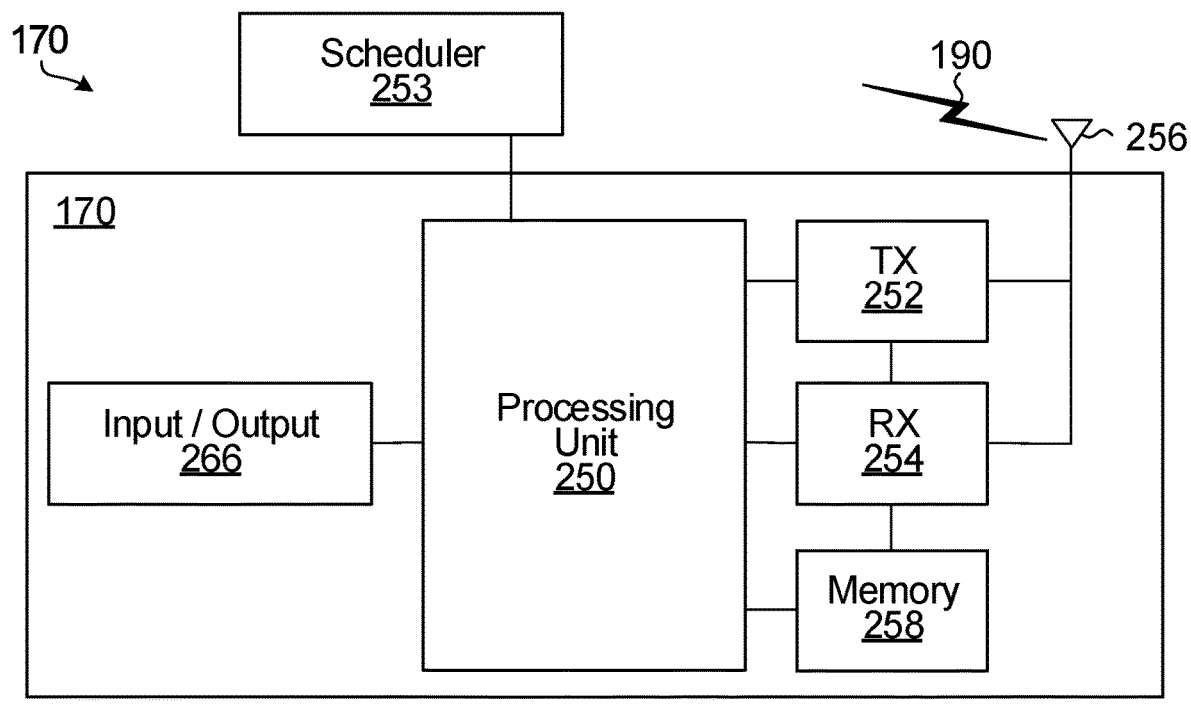
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
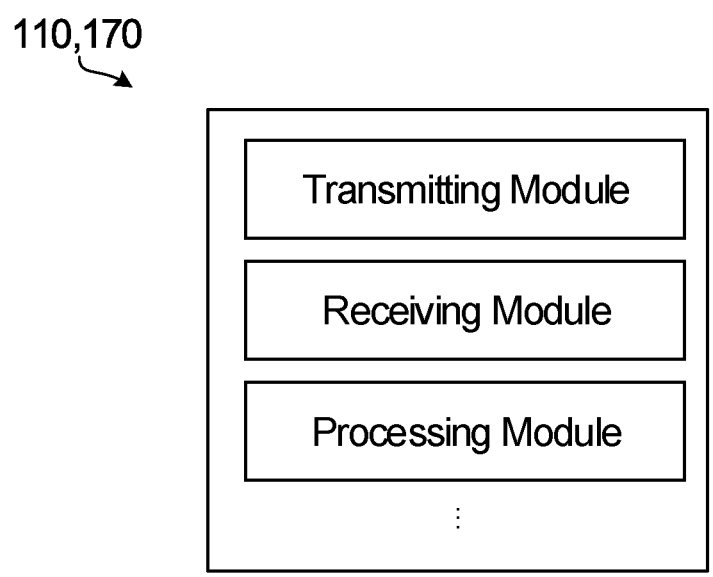
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, such as the uplink message generator, downlink message processor, encoder, decoder, LBT unit, resource allocator, downlink message generator, and/or uplink message processor described below. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
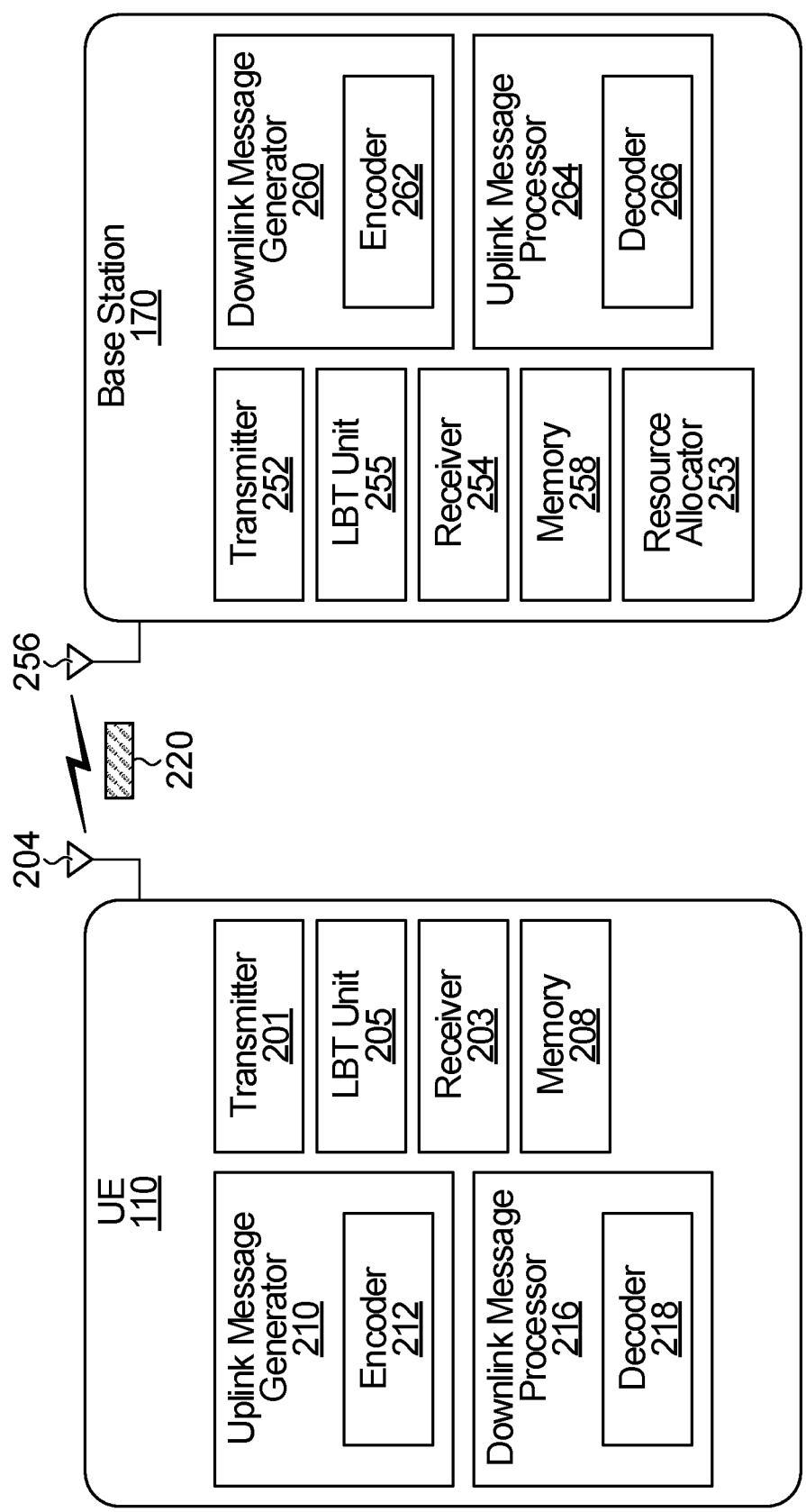
FIG. 5 is a block diagram of an example user equipment and base station.

FIG. 5 illustrates another example of an ED 110 and a base station 170. The ED 110 will hereafter be referred to as a user equipment (UE) 110. A transport block (TB) 220 is illustrated as being wirelessly transmitted between the base station 170 and the UE 110.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation, message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes an LBT unit 255 that may be used to implement the LBT protocols discussed herein when communicating on unlicensed spectrum. The LBT unit 255 may be part of the transmitter 252 and/or receiver 254. The base station 170 further includes a downlink message generator 260 for generating a downlink transmission to be sent to the UE 110, e.g. for generating the transmissions that convey the downlink control information (DCI) and downlink data transmissions described later. The downlink message generator 268 includes an encoder 262 for encoding the data to be sent in the downlink transmission. The downlink message generator 260 may be part of the transmitter 252. The base station 170 further includes an uplink message processor 264 for processing uplink transmissions received from the UE 110, e.g. for processing the uplink hybrid automatic repeat request (HARQ) feedback described later. The uplink message processor 264 includes a decoder 266 for decoding the uplink transmission, e.g. for performing the blind decoding described later. The uplink message processor 264 may be part of the receiver 254. The base station 170 further includes a resource allocator 253, which may schedule the uplink resources to be allocated to UE 110 for uplink transmissions, and which may also schedule downlink transmissions. For example, the resource allocator 253 allocates the plurality of uplink resource partitions described later, e.g. the uplink control channels, such as PUCCHs, across different component carriers that may be used to send the uplink HARQ feedback. The base station 100 further includes a memory 258 for storing information and data.

The downlink message generator 260, the encoder 262, the uplink message processor 264, the decoder 266, the resource allocator 253, the LBT unit 255, and/or any signal processing components of the transmitter 252 and receiver 254, may be implemented in the form of circuitry configured to perform the functions of the downlink message generator 260, the encoder 262, the uplink message processor 264, the decoder 266, the resource allocator 253, the LBT unit 255, and/or the transmitter 252 and receiver 254. In some implementations the circuitry includes memory 258 and one or more processors, such as processing unit 250 described earlier, that execute instructions that cause the one or more processors to perform the operations of the downlink message generator 260, the encoder 262, the uplink message processor 264, the decoder 266, the resource allocator 253, the LBT unit 255, and/or the transmitter 252 and receiver 254. Alternatively, the downlink message generator 260, the encoder 262, the uplink message processor 264, the decoder 266, the resource allocator 253, the LBT unit 255, and/or the transmitter 252 and receiver 254, may be implemented by a processing unit using dedicated integrated circuitry, such as an ASIC, a GPU, or an FPGA for performing the operations of the downlink message generator 260, the encoder 262, the uplink message processor 264, the decoder 266, the resource allocator 253, the LBT unit 255, and/or the transmitter 252 and receiver 254.

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202. The UE 110 further includes an LBT unit 205 that is used to implement the LBT protocols discussed herein when communicating on unlicensed spectrum. The LBT unit 205 may be part of the transmitter 201 and/or receiver 203. The UE 110 further includes a downlink message processor 216, including a decoder 218. The downlink message processor 216 and decoder 218 perform operations relating to processing a received downlink message, such as the UE HARQ operations described herein, e.g. generating acknowledgements (ACKs) and/or negative acknowledgements (NACKs). The downlink message processor 216 may be part of the receiver 203. The UE 110 further includes an uplink message generator 210, including an encoder 212. The uplink message generator 210 and encoder 212 perform operations relating to generating an uplink transmission, e.g. an uplink message to be sent on an unoccupied one of the plurality of uplink resource partitions described later, such as HARQ feedback to send on an uplink control channel, such as a PUCCH. For example, the encoder 212 may perform operations relating to preparing an ACK or NACK for transmission to the base station 170. The uplink message generator 210 may be part of the transmitter 201. The UE 110 further includes a memory 208 for storing information and data.

The downlink message processor 216, the decoder 218, the uplink message generator 210, the encoder 212, the LBT unit 205, and/or any signal processing components of the transmitter 201 and receiver 203, may be implemented in the form of circuitry configured to perform the functions of the downlink message processor 216, the decoder 218, the uplink message generator 210, the encoder 212, the LBT unit 205, and/or the transmitter 201 and receiver 203. In some implementations the circuitry includes memory 208 and one or more processors, such as processing unit 200 described earlier, that execute instructions that cause the one or more processors to perform the operations of the downlink message processor 216, the decoder 218, the uplink message generator 210, the encoder 212, the LBT unit 205, and/or the transmitter 201 and receiver 203. Alternatively, the downlink message processor 216, the decoder 218, the uplink message generator 210, the encoder 212, the LBT unit 205, and/or the transmitter 201 and receiver 203, may be implemented by a processing unit using dedicated integrated circuitry, such as an ASIC, a GPU, or an FPGA for performing the operations of the downlink message processor 216, the decoder 218, the uplink message generator 210, the encoder 212, the LBT unit 205, and/or the transmitter 201 and receiver 203.

The base station 170 and the UE 110 may include other components, but these have been omitted for the sake of clarity.

HARQ for Wireless Communications

Hybrid automatic repeat request (HARQ) is a method in which data to be transmitted is encoded using an error correction code. If the encoded data is corrupted during transmission and the receiver is unable to correct the errors, a retransmission is performed.

HARQ may be performed for uplink and/or downlink transmissions. For example, if TB 220 is sent from the base station 170 to the UE 110 in an initial downlink transmission, and the TB 220 is not successfully decoded by the UE 110, then a retransmission may be performed by the base station 170. The word "transmission" as used herein, may refer to an initial transmission or a retransmission. A retransmission may include a retransmission of the TB 220 and/or further information for decoding the TB 220. For example, the retransmission data may include some or all of the original data and/or parity information. In some embodiments, the HARQ transmission may include one or more code block groups (CBGs) of the TB. The decoder 218 of the UE 110 may perform HARQ combining as follows: instead of discarding unsuccessfully decoded initial data, the unsuccessfully decoded initial data may be stored at the UE 110 in memory 208 and combined with received retransmission data to try to successfully decode the TB 220. When HARQ combining is performed, the retransmission data from the base station 170 may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). Different RVs may also be referred to as different revisions. When data is encoded by encoder 262 in the base station 170, the encoded bits may be partitioned into different sets that possibly overlap with each other. Each set is a different RV. For example, some RVs may have more parity bits than other RVs. Each RV is identified by an RV index, e.g. RV 0, RV 1, RV 2, . . . etc. When a downlink transmission is sent using a particular RV, then only the encoded bits corresponding to that RV are transmitted. Different channel codes may be used to generate the encoded bits, e.g. turbo codes, low-density parity-check (LDPC) codes, polar codes, etc. In one embodiment, the channel coding for one or more packets results in three bit streams: a systematic bit stream and two parity bit streams. Rate matching may be performed, and a circular buffer (not illustrated) may store the systematic and parity bits. The bits may be read from the circular buffer and modulated for transmission in the uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The UE 110 uses knowledge of the RV to perform decoding. For chase combining, the RV 0f the initial and retransmissions may be the same, e.g. RV 0. For incremental redundancy, the retransmissions may use a higher RV that may follow a predetermined pattern, e.g. RV 0 for the initial transmission, RV 2 for the first retransmission, RV 3 for the second retransmission, and RV 1 for the third retransmission. Therefore, in order to decode the data, it may be necessary for the UE 110 to know the RV index of the data being received, unless there is only one predefined RV.

As part of the HARQ procedure for a downlink transmission, an ACK may be sent by the UE 110 when the UE 110 successfully decodes the TB of the downlink transmission. In some embodiments, a NACK may be sent by the UE 110 when the TB is not successfully decoded. The ACK and NACK are examples of HARQ feedback. HARQ feedback is sometimes alternatively referred to as ACK/NACK feedback or A/N feedback. The HARQ ACK/NACK feedback may also be CBG-based, meaning that the feedback gives information about which CBGs have or have not been successfully decoded.

A HARQ process may be synchronous, in which case retransmissions are scheduled at predetermined time intervals and based on a systematic timing derived from the system information, e.g. as in LTE grant-based uplink HARQ. If a HARQ process is not synchronous, then it is asynchronous.

Wireless Communication on Licensed and Unlicensed Spectrum

A wireless communication between a UE 110 and a base station 170 is transmitted on a carrier frequency, e.g. on a component carrier (CC). A CC may be referred to as a cell. Some CCs may be on licensed spectrum, whereas other CCs may be on unlicensed spectrum. A CC on unlicensed spectrum may be referred to as an unlicensed CC. A CC may be characterized by its bandwidth and the center frequency of the CC. For example, the bandwidth of an unlicensed CC may be 20 MHz, an integer multiple of 20 MHz, or some other bandwidth.

The UE 110 may wirelessly communicate with the base station 170 on one or more bandwidth parts (BWPs) within the bandwidth of a CC. A BWP is a contiguous set of frequency subcarriers selected from the contiguous subcarriers of a given CC for a given numerology, e.g. for a given subcarrier spacing (SCS). A BWP of a CC may be referred to as a carrier BWP. The network may configure the UE 110 to transmit and/or receive data and/or control information on one or more uplink and/or downlink BWPs. The configuration of BWPs in a CC is UE-specific. From the network's perspective, UEs configured to use the same CC may have different configurations of BWPs. For example, UE 110 may be configured to transmit and/or receive on two BWPs of a CC, whereas another UE may be configured to transmit and/or receive on three BWPs of the same CC, whereas another UE may be configured to only transmit and/or receive on one BWP of that same CC. In some cases, the UE may be configured to transmit and/or receive on multiple BWPs of the same CC, and the base station may activate a single BWP at a time. The BWPs configured for a UE on the same CC may have the same or different bandwidths. The one or more BWPs configured for one UE may partially or fully overlap with the one or more BWPs configured for one or more of the other UEs on the CC. Also, if a UE is configured to transmit and/or receive on multiple BWPs on a CC, then that UE's multiple BWPs may be contiguous with each other, or the multiple BWPs may partially or fully overlap with each other. A BWP may thus comprise one or more unlicensed channels. Each channel refers to a CC or a part of a CC consisting of a contiguous set of resource blocks (RBs) on which a channel access procedure is performed in the unlicensed spectrum.

Figure 6:
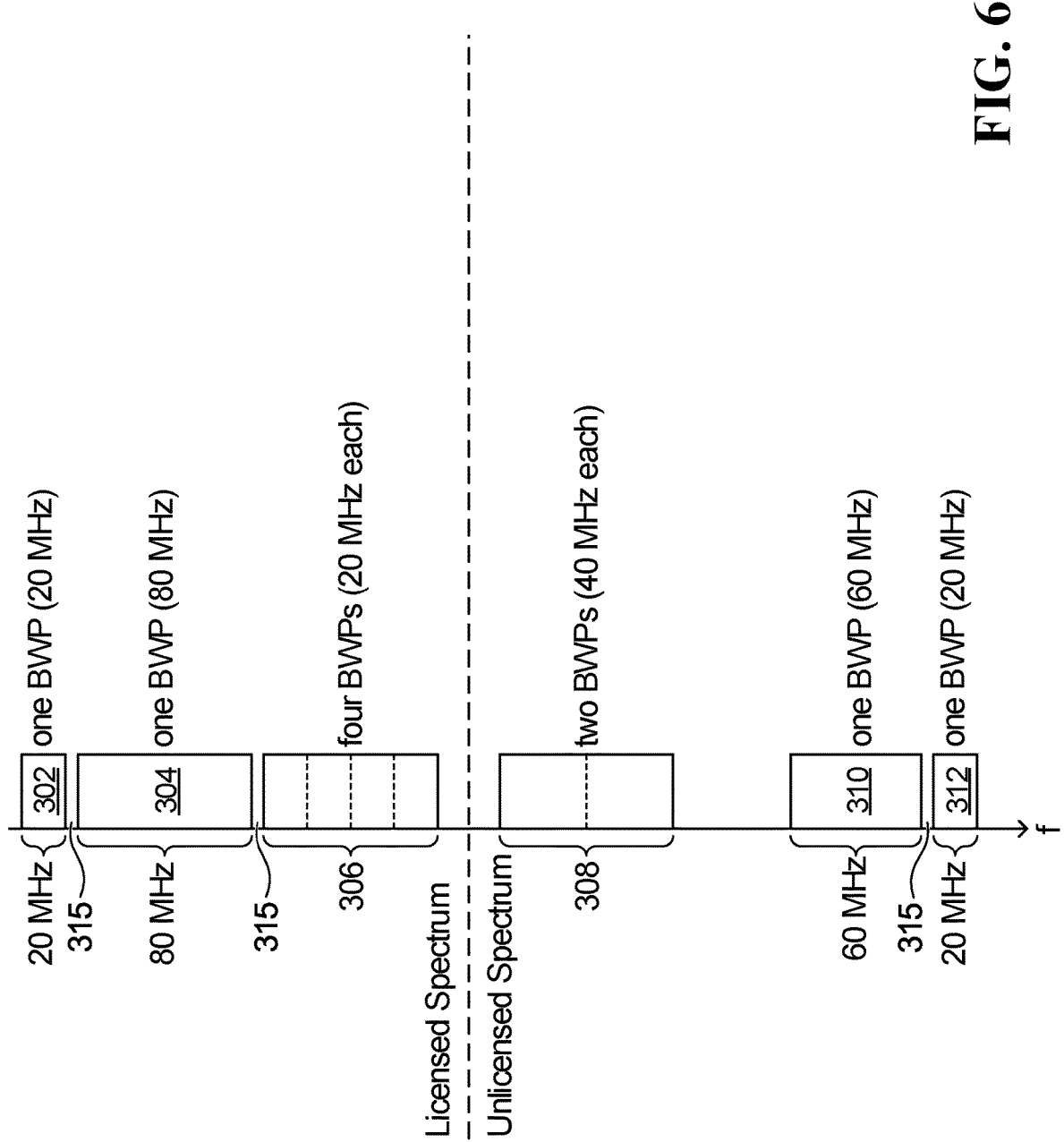
FIG. 6 illustrates an example of bandwidth parts on licensed and unlicensed spectrum.

FIG. 6 illustrates an example of six CCs on a frequency spectrum of a wireless medium. The six CCs are respectively labelled 302, 304, 306, 308, 310, and 312. CCs 302, 304, and 306 are in the licensed spectrum and are contiguous with each other, although a guard band 315 may be interposed between adjacent pairs of contiguous CCs. CCs 308, 310, and 312 are in the unlicensed spectrum. CCs 310 and 312 are contiguous with each other, and may be separated by a guard band 315. CC 308 is not contiguous with CC 310. In FIG. 6, CC 302 has a bandwidth of 20 MHz and consists of one BWP configured for a UE. CC 304 has a bandwidth of 80 MHz and consists of one BWP configured for a UE. CC 306 has a bandwidth of 80 MHz and consists of four adjacent contiguous BWPs configured for a UE, each BWP being 20 MHz. CC 308 has a bandwidth of 80 MHz and consists of two adjacent contiguous BWPs configured for a UE, each BWP being 40 MHz. CC 310 has a bandwidth of 60 MHz and consists of one BWP configured for a UE. CC 312 has a bandwidth of 20 MHz and consists of one BWP configured for a UE. The CCs shown in FIG. 6 are only examples. More generally, a CC may be on licensed or unlicensed spectrum, a CC may be contiguous with other CCs or not, a CC may have any bandwidth up to the maximum number of subcarriers the radio frequency (RF) chain can handle in parallel, and a CC may consist of one or more BWPs. If a CC consists of more than one BWP, then each BWP may have a same bandwidth, or one or more of the BWPs may have different bandwidths. Different BWPs may be used to transmit at different numerologies, e.g. at different subcarrier spacings (SCSs) and/or Cyclic Prefix (CP) lengths. Although not shown in FIG. 6, different BWPs may overlap each other in frequency.

A BWP of a CC may be used to send and/or receive wireless communications on the time-frequency resources of the BWP. In some embodiments, a BWP can be associated with an index to identify the BWP within a set of preconfigured BWPs. In a frequency division duplex (FDD) scheme, the UE may be configured with one or more downlink BWPs on a downlink CC and one or more uplink BWPs on an uplink CC. In such an implementation, an uplink BWP can be paired with a downlink BWP for FDD communications with the network. However, in a time division duplex (TDD) scheme, i.e., unpaired spectrum, a downlink BWP and an uplink BWP with the same index are implicitly paired for TDD communications with the network.

Figure 7:
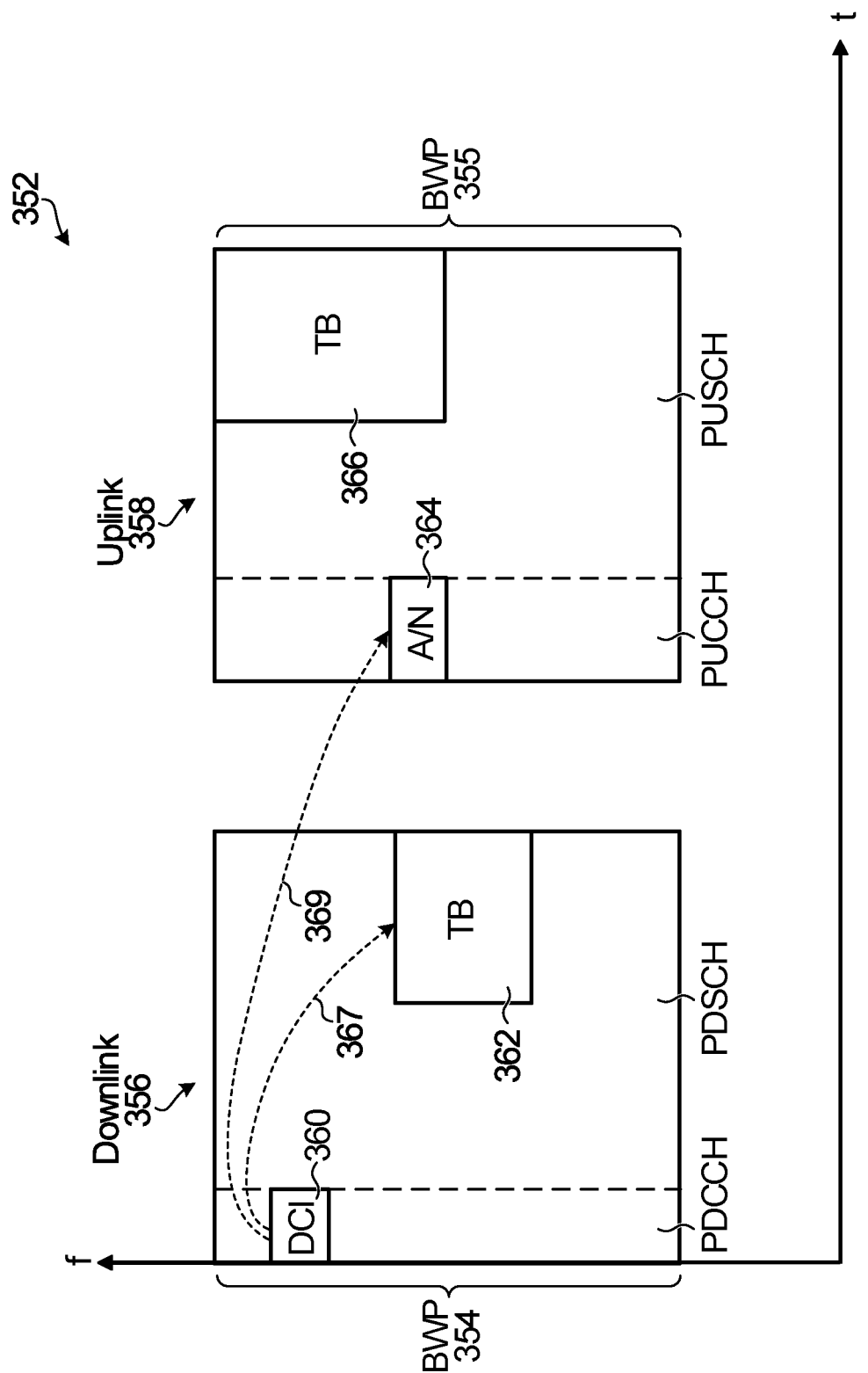
FIG. 7 illustrates time-frequency resources in a time division duplex scheme.

For example, FIG. 7 illustrates a set of time-frequency resources 352 in a TDD scheme in which a BWP 354 has downlink time-frequency resources 356, and in which a paired uplink BWP 355 has uplink time-frequency resources 358. BWPs 354 and 355 are illustrated as having the same bandwidth, but this need not be the case. For example, BWPs 354 and 355 may be aligned in terms of central frequency, but may have different bandwidths. The downlink time-frequency resources 356 are used to transmit downlink transmissions from the base station 170 to the UE 110, e.g. via OFDM symbols. Some of the downlink time-frequency resources may be used to send control information, such as downlink control information (DCI), and other downlink time-frequency resources may be used to send data. For example, FIG. 7 illustrates a physical downlink control channel (PDCCH) on which DCI 360 is transmitted to UE 110, and a physical downlink shared channel (PDSCH) on which a transport block (TB) 362 carrying data is transmitted to UE 110. One DCI may correspond to one PDCCH, or the PDCCH may carry multiple DCIs. The time-frequency resources used to carry the one or more DCIs may be referred to as a COntrol REsource SET ("CORESET").

The uplink time-frequency resources 358 are used to transmit uplink transmissions from the UE 110 to the base station 170, e.g. via OFDM symbols. Some of the uplink time-frequency resources may be used to send uplink control information (UCI), such as HARQ feedback for the downlink transmissions, and other uplink time-frequency resources may be used to send data. As an example, FIG. 7 illustrates a physical uplink control channel (PUCCH) on which HARQ feedback 364 is transmitted to base station 170, and a physical uplink shared channel (PUSCH) on which a TB 366 is transmitted to base station 170.

The downlink time-frequency resources 356 and/or the uplink time-frequency resources 358 may be partitioned into time intervals. Each time interval may be called a subframe or slot or mini-slot or scheduling interval, depending upon the implementation.

In some embodiments, the DCI 360 sent in the PDCCH may both: i) schedule the TB 362 on a partition of the time-frequency resources of the PDSCH, as shown via stippled line 367; and ii) grant the uplink resources, including the uplink time-frequency resource allocation for the PUCCH that is used for sending the HARQ feedback 364 for the TB 362, as shown via stippled line 369. Although not shown in FIG. 7, the DCI 360 may schedule a transmission of multiple TBs in the downlink data channel, in which case the resources for the HARQ feedback for each of the multiple TBs may also be allocated by the DCI 360. FIG. 7 only shows the example of one scheduled downlink TB 362 and corresponding HARQ feedback 364.

The partition of the PDCCH and the PDSCH in the downlink, and the partition of the PUCCH and PUSCH in the uplink, are only examples and may be logical partitions. In some embodiments, the occupied physical resources of the PUCCH or the PUSCH may be interlace-based, i.e., the occupied physical resource blocks (PRBs) or resource elements (REs) may be spread across the channel bandwidth to satisfy the regulatory minimum occupied channel bandwidth requirement (OCB).

Figure 8:
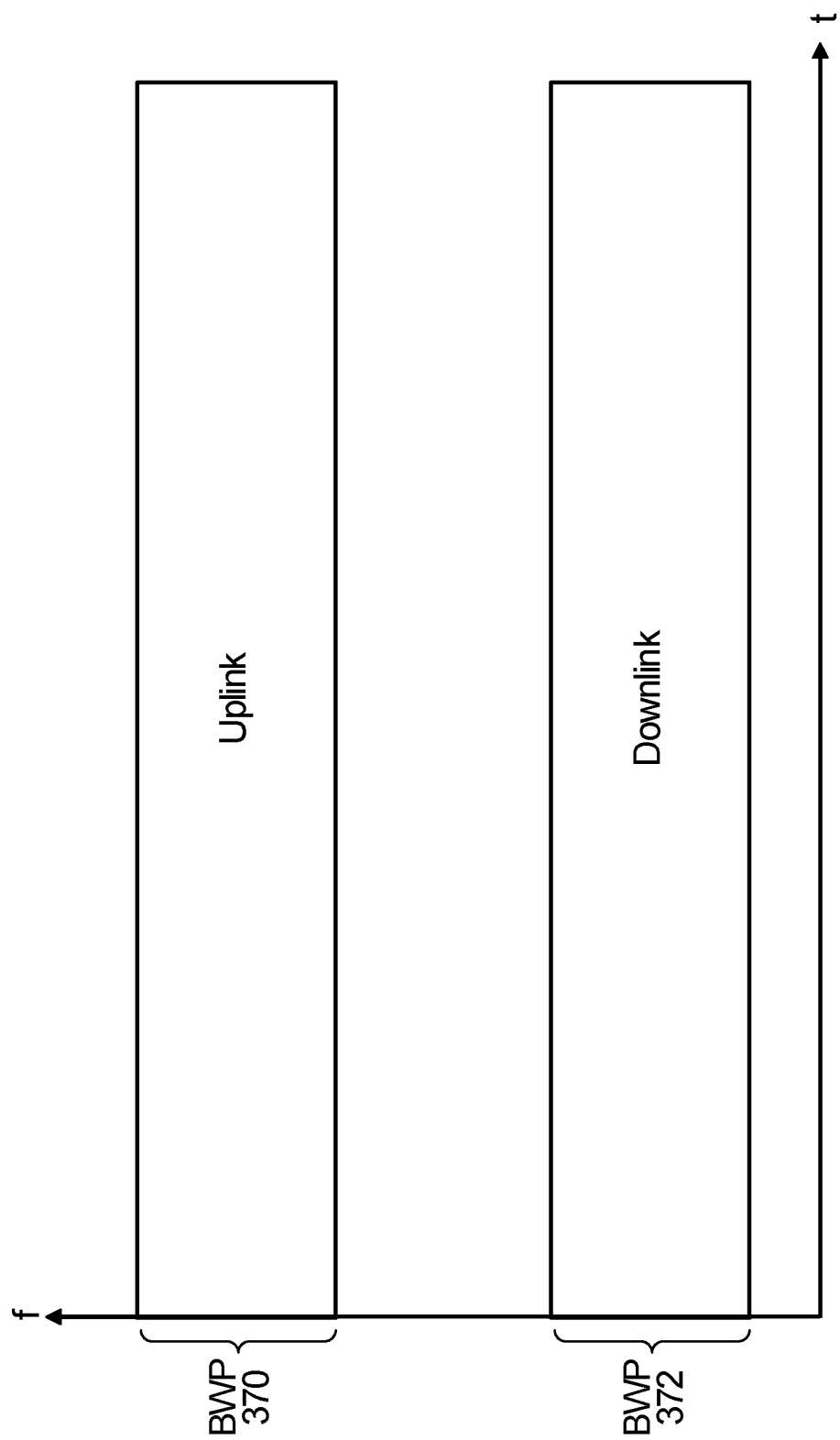
FIG. 8 illustrates two contiguous bandwidth parts in a frequency division duplex scheme.

In an FDD implementation, one BWP or portion thereof may be used for downlink, and another BWP or portion thereof may be used for uplink. FIG. 8 illustrates two contiguous BWPs 370 and 372. BWP 370 is used for uplink transmissions, and BWP 372 is used for downlink transmissions.

The TDD implementation of FIG. 7 is an example of unpaired spectrum, and the FDD implementation of FIG. 8 is an example of paired spectrum. Paired BWPs may be inherent for unpaired spectrum, e.g. paired BWPs may be inherent for TDD.

A BWP is considered "active" for UE 110 when the UE 110 is activated to transmit and/or receive on the BWP. If a BWP is active for UE 110, then the UE 110 is said to be active on the BWP. For example, returning to FIG. 6, UE 110 may be active to send and receive transmissions on one, some, or all of the four BWPs on CC 306. In some embodiments, UE 110 may be activated and deactivated to use certain BWPs via control information received from the base station 170.

A primary cell ("PCell") is the primary CC used by the UE 110 to communicate with the network, e.g. to receive configuration messages and activate/deactivate secondary cells. A secondary cell ("SCell") is a secondary CC that may be used by the UE 110 to communicate with the network. In dual connectivity (DC) mode, the UE 110 may have multiple active links to different base stations, in which case the primary cell of a secondary base station, e.g. of a micro base station, may be referred to as a primary secondary cell ("PSCell").

When wirelessly communicating on unlicensed spectrum, there is an expectation that the time-frequency resources allocated for downlink and/or uplink transmissions may be occupied by other coexisting transmitters/systems, which may cause interference. Therefore, a device operating on unlicensed spectrum may use a listen-before-talk (LBT) protocol in which the device first listens to the wireless channel to determine the availability of the channel, before sending a transmission. The wireless channel may sometimes be referred to as the medium.

For example, before UE 110 sends an uplink transmission on particular frequency resources, e.g. on a particular active BWP or portion thereof, the UE 110 may listen to the wireless channel on those frequency resources. The UE 110 may listen for a configured or randomly generated duration of time before sending the uplink transmission. For example, the UE 110 may listen over multiple clear channel assessment (CCA) time slots to determine whether the channel is available on the frequency resources. If another transmission is already occurring, then the channel is said to be occupied, busy or acquired. If the UE 110 detects that the channel is unavailable, e.g. because the channel is already occupied, the UE 110 will not send the uplink transmission on the allocated resource. If the UE 110 determines that the channel is available, i.e. that the channel is unoccupied, idle, or "free", then the UE 110 acquires the channel and sends the uplink transmission. However, there still may be a collision due to the hidden node problem, e.g. if another UE or base station that is too far from UE 110 to be sensed also transmits concurrently causing interference at the base station 170.

Similarly, before base station 170 sends a downlink transmission on particular frequency resources on unlicensed spectrum, the base station 170 may listen to the wireless channel on those frequency resources to determine whether the channel is already occupied. If the base station 170 detects activity, e.g. another transmission, the base station 170 will not send the downlink transmission on the allocated resources. If the base station 170 determines that the channel is unoccupied, the base station 170 acquires the channel and sends the downlink transmission.

A transmission that is sent using an LBT protocol may be referred to as an "LBT-based transmission". Different LBT protocols may be used to perform LBT-based transmissions.

For example, one type of LBT protocol is referred to as LBT category 4 ("LBT CAT4"). In LBT CAT4, before sending a transmission the transmitter first listens to the wireless channel for a period of time 'A' to determine whether the channel is occupied. The period of time 'A' is based in part on a randomly generated contention window. If the channel is determined to be unoccupied, then the transmitter sends the transmission. The listening period in LBT CAT4 comprises a fixed period, distributed/adaptive inter-frame spacing (DIFS/AIFS), followed by a backoff period equal to a backoff counter value N multiplied by the CCA slot duration (typically 9 μs). The backoff counter value is uniformly randomly generated from the contention window size (CWS) defined by the interval [0, CW_p], where CW_p is adjusted between CW_min,p and CW_max,p based on receiver feedback for collision avoidance. The backoff counter is decremented every CCA slot for which the channel is idle until it reaches 0 allowing the transmission to start. Each time the backoff counter reaches zero, a new N is generated from the CWS. However, if the channel is determined as busy in any CCA slot of the listening period, the backoff counter value is frozen and the transmission is deferred to the next access attempt starting from the frozen value. CW_p is initialized as equal to CW_min,p, but when a collision is detected, e.g., NACK ratio>a threshold or in absence of feedback, CW_p is enlarged by an integer multiplier m (typically m=2) until it saturates at CW_max,p. The values AIFS, CW_min,p and CW_max,p are determined by the Channel Access Priority Class value p corresponding to the traffic type, e.g., p=1 highest priority and p=4 lowest priority.

Another type of LBT protocol is referred to as LBT category 2 ("LBT CAT2"), which is also known as "one-shot LBT" or "short LBT". In LBT CAT2, the period of time 'A' during which the transmitter listens to the wireless channel is a short pre-set duration, e.g. A=25 μs or A=16 μs. In the uplink, LBT CAT4 is called LBT Type 1, and LBT CAT 2 is called LBT Type 2.

When LBT failure occurs, the transmission is cancelled or deferred. The time delay incurred because of an LBT failure is referred to as blocking time.

Wireless Communication on Unlicensed Spectrum in New Radio (NR)

LTE-based licensed-assisted access (LAA) to the unlicensed spectrum was specified to provide access to unlicensed CCs as SCells, through carrier aggregation (CA) with an anchor licensed primary CC (PCell). Both uplink and downlink transmissions on unlicensed spectrum were supported in later releases, but transmission of critical UCI was limited to the more reliable licensed anchor cell, i.e., the PCell, or the PSCell in the case of dual connectivity.

New radio (NR)-based access to the unlicensed spectrum is referred to as new radio unlicensed (NR-U). In NR-U, the bandwidth of a CC may be 20 MHz, or an integer multiple of 20 MHz. 20 MHz is often a typical unlicensed channel bandwidth, but other channel bandwidths are possible. Various deployment scenarios may be possible for NR-U, e.g.

- Scenario A: Carrier aggregation between licensed band NR (PCell) and NR-U (SCell). In this scenario, the NR-U SCell may support both downlink and uplink transmissions, or only downlink transmissions.
- Scenario B: Dual connectivity between licensed band LTE (PCell) and NR-U (PSCell).
- Scenario C: Stand-alone NR-U.
- Scenario D: An NR cell with downlink in unlicensed band and uplink in licensed band.
- Scenario E: Dual connectivity between licensed band NR (PCell) and NR-U (PSCell).

In some of the possible deployment scenarios for NR-U, there might not be an anchor licensed cell, e.g. the PCell or PSCell may be in the unlicensed band.

In NR, resource allocation for the PUCCH on which the UCI is sent is indicated in the DCI scheduling the respective PDSCH transmission, e.g. as shown by stippled line 369 in FIG. 7 and discussed above. The UCI includes HARQ feedback information, which is typically critical to system performance.

In some scenarios, the UE may be configured with an uplink resource for transmitting the UCI on a licensed CC, such as in a PCell or a PSCell in the carrier aggregation mode or the dual connectivity mode, respectively. The uplink resource may be a PUCCH resource. However, in NR-U, if the uplink resource for transmitting the UCI is allocated on unlicensed spectrum, then the UE might not be able to gain medium access to transmit the UCI due to LBT failure. A more detailed explanation follows using an example in which the UCI is HARQ feedback corresponding to a downlink TB.

The base station 170 may send a downlink transmission to the UE 110 that schedules an uplink transmission in unlicensed spectrum of a wireless channel. For example, the base station 170 may transmit DCI to the UE 110. The DCI may schedule a transmission of one or multiple TBs in the downlink data channel, and the DCI may also allocate an uplink resource, e.g. a PUCCH resource, in which the UE 110 can transmit UCI including HARQ feedback corresponding to the one or multiple TBs. An example is DCI 360 illustrated in FIG. 7. However, on an unlicensed CC, the UE 110 might not be able to gain channel access to transmit the HARQ feedback on the allocated uplink resource. For example, if the UE 110 is to transmit the HARQ feedback in a LBT-based transmission on the allocated uplink resource using an LBT protocol, and if the UE 110 determines that the wireless channel at the frequency region of the allocated uplink resource partition is already occupied, then the UE 110 will not send the LBT-based transmission on the allocated uplink resource partition. The UE 110 may try to send the HARQ feedback in a later transmission instead. In an asynchronous HARQ process, a retransmission might not occur for several subframes if there is a blocked or lost HARQ feedback transmission because of LBT failure or because of persistent collisions with the transmissions of hidden nodes on the unlicensed CC. Even if the base station 170 were to allocate multiple uplink time-frequency resources in the time domain, e.g. multiple PUCCHs in the time domain, but on the same frequency resources, the uplink transmissions may still be blocked/lost due to long occupancy of the channel, which may lead to triggering an ARQ retransmission at a higher network layer. For example, an ARQ retransmission of the associated protocol data unit (PDU) may be triggered by the radio link control (RLC) sublayer, which would result in potentially significant delays and throughput loss.

Therefore, on an unlicensed CC in NR-U, the UE might not be able to gain medium access to transmit the HARQ feedback on the allocated PUCCH resource due LBT failure, which may lead to triggering an ARQ retransmission.

Embodiments herein aim to provide more reliable LBT-resilient mechanisms for the resource allocation of the uplink control channel and the transmission of UCI, e.g. HARQ feedback, in the unlicensed spectrum.

A CC may be considered "wideband" when the bandwidth is greater than 20 MHz, which is the channel bandwidth of legacy WLAN. Systems and methods for allocating multiple PUCCH resources on a wideband CC were disclosed in U.S. patent application Ser. No. 16/203,030, which was filed on Nov. 28, 2018, entitled "Systems and Methods for Allocation of Uplink Control Channel Resources in Unlicensed Spectrum", and which is incorporated herein by reference. However, systems and methods for allocating multiple PUCCH resources on a wideband CC are not applicable to implementations in which the unlicensed PCell/PSCell is not configured as a wideband CC, or when the active uplink BWP is not configured as wideband, e.g. when the CC only has a bandwidth of 20 MHz, i.e., spans a single LBT subband.

Instead, in embodiments below, multiple uplink resource partitions are allocated across different CCs, and any one of the multiple uplink resource partitions may potentially be used to send the UCI. The CCs need not be wideband, e.g. the PCell/PSCell might only span a 20 MHz unlicensed channel. An allocated uplink resource partition consists of at least an allocated uplink time-frequency resource partition, and possibly other resource parameters. An allocated PUCCH is an example of an allocated uplink resource partition. Therefore, in some embodiments, multiple PUCCH resources may be indicated across multiple CCs, including SCells. Some embodiments may address the deployment scenario of Standalone (SA) CA in which the CCs are not necessarily wideband carriers.

In the NR-U working item, one candidate HARQ feedback mechanism is "Alt4: preconfigured/pre-indicated multiple opportunities in frequency domain in different LBT subbands". Embodiments below are primarily directed to this type of HARQ feedback mechanism, but in the context of CCs that might not be wideband. Some embodiments below primarily apply to NR-U deployment scenarios B, C, and E described above, and in particular NR-U deployment scenario C described above.

An LBT subband, as used herein, refers to a 20 MHz unlicensed channel. The CCs/cells discussed in many of the embodiments below are not wideband and each have a bandwidth of 20 MHz. Therefore, in many of the embodiments below each LBT subband is on a respective different CC/cell. However, more generally, different LBT subbands may be on the same CC/cell, e.g. in the case of a wideband CC/cell.

Configuring Multiple Uplink Resources Across Multiple CCs in Unlicensed Spectrum UE 110 is pre-configured with a group of CCs, i.e. a group of cells, on which the UE 110 may wirelessly communicate in unlicensed spectrum. The group of cells include SCells. The group of cells may be referred to as the "configured cell group". At a particular time during operation, the UE 110 might only be activated to wirelessly communicate on certain cells of the configured cell group. The activated cells in the configured cell group will be referred to as the "activated cell group". For example, the activated cell group for UE 110 may be at most 8 cells indexed as 0 to 7. The cells in the activated cell group may change over time. For example, at a particular point in time, UE 110 might only be activated to wirelessly communicate on cells 0, 1, 2, and 5 of the activated cell group.

In some embodiments, a plurality of uplink resource partitions, e.g. uplink time-frequency resource partitions, are preconfigured for the UE 110 across different ones of the CCs, i.e. across different ones of the cells. The preconfigured uplink resource partitions are for sending UCI. In some embodiments, the base station 170 may use higher-layer signaling to preconfigure the uplink resource partitions for the UE 110. One example of higher-layer signaling is radio resource control (RRC) signaling. Another example of higher-layer signaling is remaining minimum system information (RMSI), which may be sent before the UE 110 is RRC connected. After the uplink resource partitions are preconfigured, during operation the base station 170 may dynamically indicate which ones of the preconfigured uplink resource partitions are allocated for sending particular UCI.

For example, in some embodiments the base station 170 pre-configures the UE 110 with one or more PUCCH resource sets per uplink BWP for each cell of some or all of the cells in the activated cell group for the UE 110. A PUCCH resource set comprises a plurality of PUCCH resources, each PUCCH resource having a respective time-frequency resource partition, and each PUCCH resource identified by a corresponding PUCCH resource index value. The base station 170 then dynamically indicates multiple PUCCH resources across multiple cells within the activated cell group. The UE 110 receives the indicated PUCCH resource allocation for the active uplink BWP on each respective indicated cell. The UE 110 is thus provided with multiple frequency-domain opportunities for the transmission of the UCI, especially the HARQ feedback for one or more scheduled PDSCHs.

In some embodiments, higher layer signaling for cell activation, e.g. in the form of RRC signaling containing a media access control (MAC) control element (CE), may be sent to the UE 110 in a PDSCH prior to the PUCCH resource indication by the UE 110 decoding/processing delay. As such, in some embodiments, the activation can be signalled in the same downlink burst or channel occupancy time (COT) containing the PUCCH resource-indicating DCI.

Figure 9:
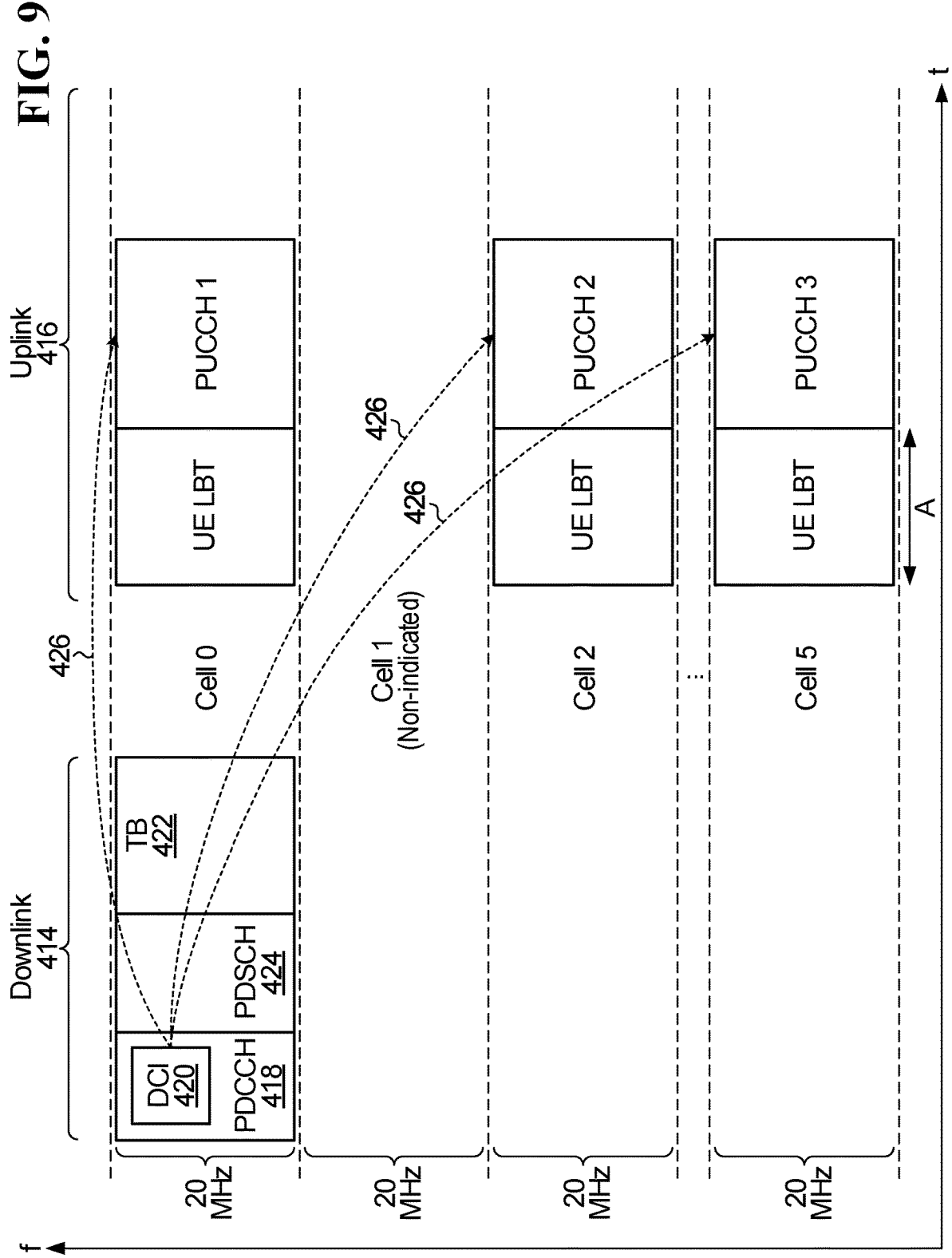
FIGS. 9 to 13 illustrate examples of uplink resources partitions across different component carriers for use in sending uplink control information.

FIG. 9 illustrates one example of UE 110 being provided with multiple frequency-domain opportunities for the transmission of the UCI. FIG. 9 illustrates an activated cell group for UE 110 that consists of cells 0, 1, 2, and 5. Each cell is a separate CC, and the bandwidth of each cell is a 20 MHz. A TDD configuration is illustrated in FIG. 9 including downlink time-frequency resources 414 on which the UE 110 may receive downlink transmissions from the base station 170, followed by uplink time-frequency resources 416 on which the UE 110 may send uplink transmissions to base station 170. The uplink time-frequency resources 416 may or might not occur immediately after the downlink time-frequency resources 414. In some embodiments, the uplink time-frequency resources 416 may occur after a small time gap (e.g. between 16 and 25 µs) from the downlink time-frequency resources 414. A PDCCH 418 sent in the downlink on cell 0 includes DCI 420. The DCI 420 schedules a downlink transmission of a TB 422 to UE 110 in a PDSCH 424 of cell 0. As shown by stippled line 426, the DCI 420 also allocates three uplink resource partitions, which in FIG. 9 are three PUCCH resources on which the UE 110 may send HARQ feedback corresponding to the TB 422. Each one of the three PUCCH resources is in a respective LBT subband on a respective different cell, and the PUCCH resources are respectively labelled PUCCH 1, PUCCH 2, and PUCCH 3. In the particular example illustrated in FIG. 9, no PUCCH is allocated on cell 1, only on cells 0, 2, and 5. The HARQ feedback is then sent in an uplink LBT-based transmission using one or more of the allocated PUCCH resources for which the LBT on the subband containing the PUCCH resource succeeds. Therefore, before sending the uplink transmission carrying the HARQ feedback, the UE 110 listens to the wireless channel on the frequency region of each of the three cells during a period of time 'A'. In some embodiments, the UE 110 listens to the wireless channel on each cell for the same amount of time, e.g., using the preset LBT CAT2 duration (A=25 µs) or using the same randomly generated contention window as in LBT CAT4. In some other embodiments, the UE 110 listens to the wireless channel on one cell for a period 'A' determined based on a randomly generated contention window as in LBT CAT4, but starts listening to the wireless channel on each of the other cells for a short preset duration, as in LBT CAT2, immediately before the uplink transmission starting point. In some other embodiments, LBT CAT4 is applied to all cells, but period 'A' is different from one cell to another based on the respective randomly generated contention window.

Figure 10:
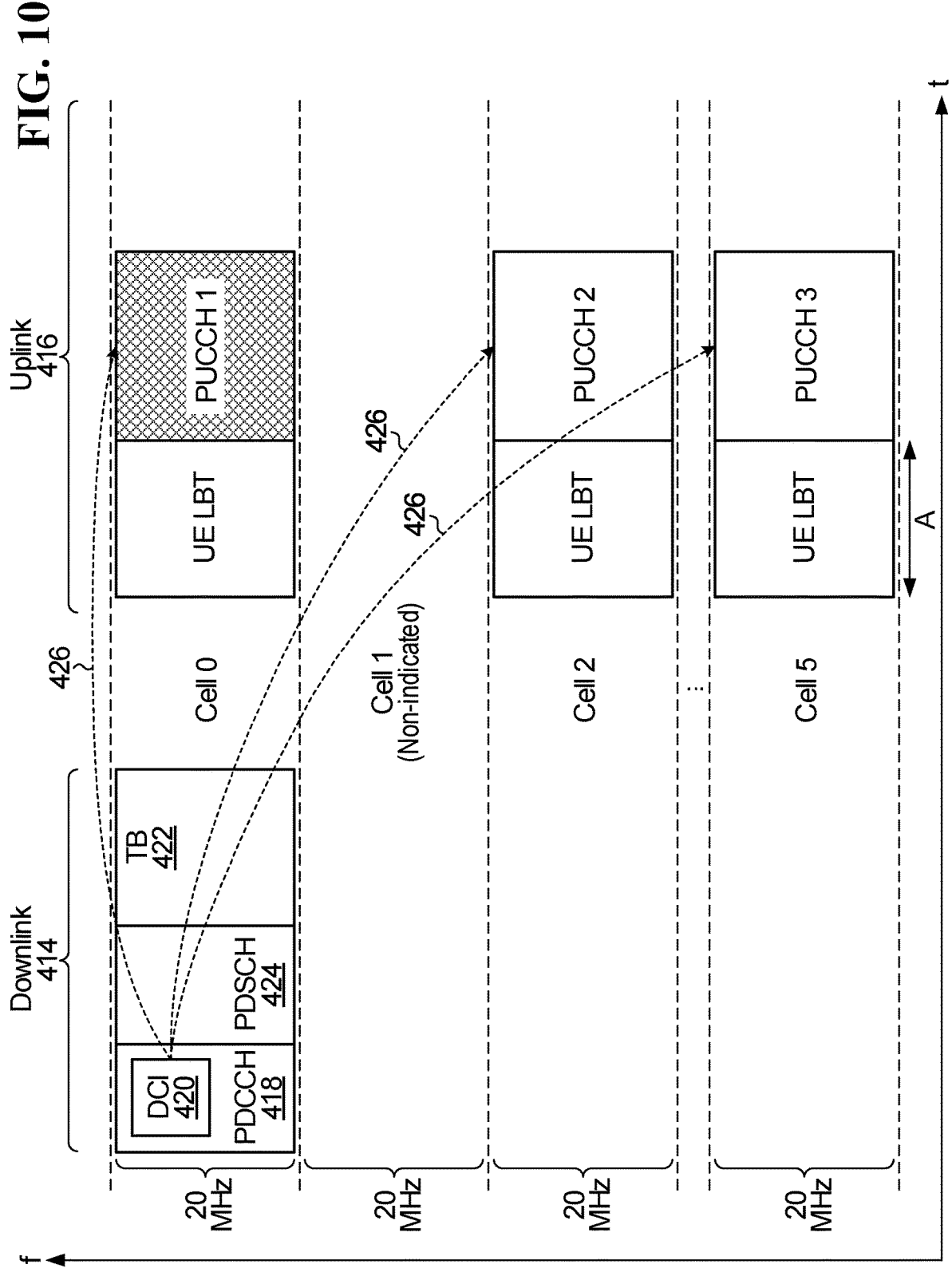

FIG. 10 illustrates an example in which the UE 110 determines that the wireless channel is already occupied on the LBT subband of cell 0, and so the uplink transmission cannot be sent on the LBT subband of cell 0. Cross-hatching is shown in PUCCH 1 in FIG. 10 because the uplink transmission cannot be sent on PUCCH 1 due to the occupied channel. However, the UE 110 determines that the channel is unoccupied on the LBT subbands of cells 2 and 5, and so the uplink transmission may be sent on cell 2 or cell 5, or possibly on both LBT subbands. By allocating multiple uplink resource partitions on respective cells, e.g. by indicating resources for PUCCH 1, PUCCH 2, and PUCCH 3 in FIGS. 9 and 10, it may be more likely that the UE 110 will be able to successfully transmit the HARQ feedback because there are multiple frequency-domain opportunities for the UE to transmit the UCI.

The UE 110 typically performs an LBT procedure before acquiring the LBT subband on which the resource has been indicated, as explained above. However, there may be exceptions, e.g.: when a PUCCH is allocated on a cell on which the UE 110 has been indicated to share the downlink channel occupancy time (COT) with a gap of no more than 16 µsec from the end of the downlink transmission, in which case no LBT is required and the following benefits may be achieved: overcoming potential collision with other nodes because the UE 110 has not performed LBT; and/or increasing reliability through redundant UCI transmission; and/or providing additional pending UCI on the additional PUCCHs.

Based on the LBT results, the UE 110 selects one or more cells on which the LBT procedure was successful, i.e., the respective LBT subband was acquired, to transmit the UCI feedback.

Because the base station 170 does not know the PUCCH on which the HARQ feedback will arrive, if any, the base station 170 performs blind detection/blind decoding of the allocated uplink resource partitions, e.g. by attempting to decode the PUCCH on each CC and selecting the UCI on which decoding is successful. Blind detection/blind decoding may also include identifying which type of UCI has been transmitted by the UE 110 on the allocated PUCCH time-frequency resource per CC. If decoding is not successful on any of the allocated PUCCHs, then the HARQ feedback might not have been transmitted, e.g. because the wireless channel was occupied in the frequency region of each of the allocated PUCCHs, or the transmission carrying the HARQ feedback may have collided with the transmission of a hidden node. In some embodiments, blind decoding is performed using the following method: the base station attempts to detect the presence of one or more signals/physical channels in a given resource, and then decodes the contained information bits if the hypothesis of a signal/channel present is most likely. Sometimes, detection of a signal/channel can be done through detecting the associated Reference Signal/Sequence.

Figure 11:
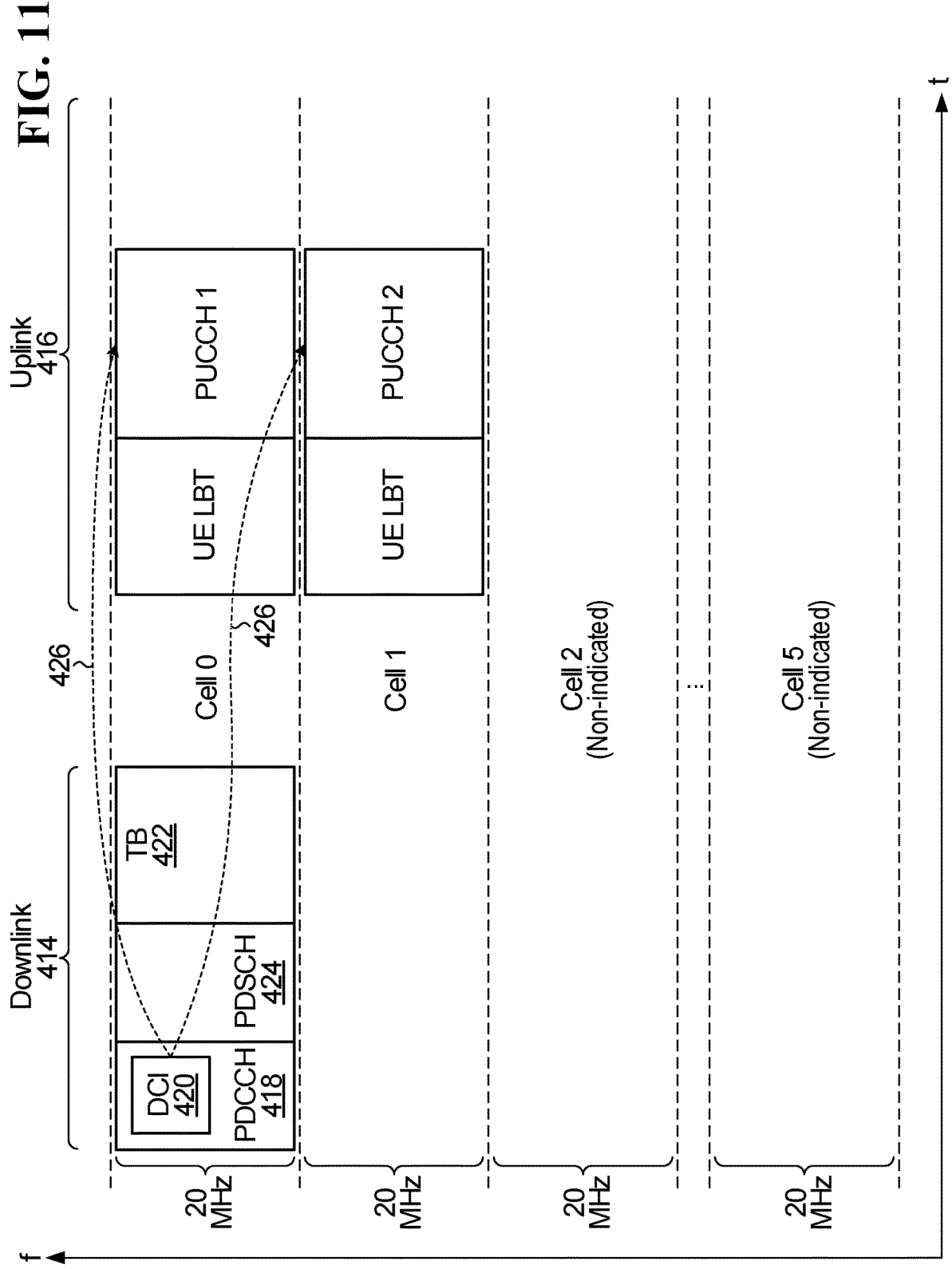

FIG. 11 illustrates a variation of FIG. 9 in which different PUCCHs are configured by DCI 420. FIG. 11 is included to illustrate the principle that different PUCCH resources possibly in different cells may be indicated for transmitting the UCI. The indication of PUCCH resources is dynamic. Example ways in which PUCCH resources may be dynamically indicated is explained later in relation to FIGS. 14 and 15.

Figure 12:
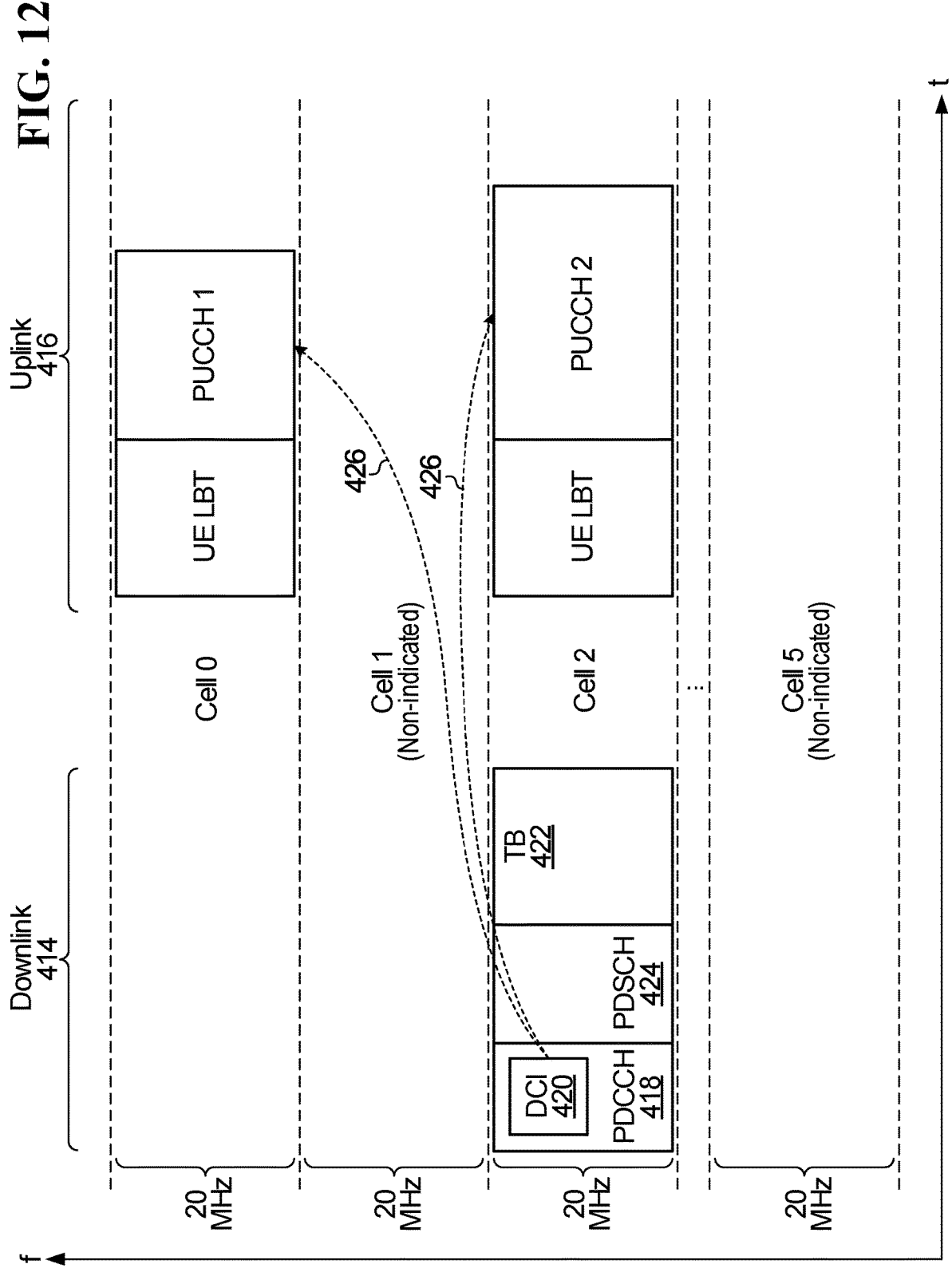

FIG. 12 illustrates a variation of FIG. 9 in which the TB 422 is instead scheduled in cell 2 and different PUCCH resources are indicated. FIG. 12 is included to illustrate the principle that a TB may be scheduled in any active cell, and not necessarily cell 0. In FIG. 12, the indication of the PUCCH resources is sent in the scheduling DCI in cell 2.

Figure 13:
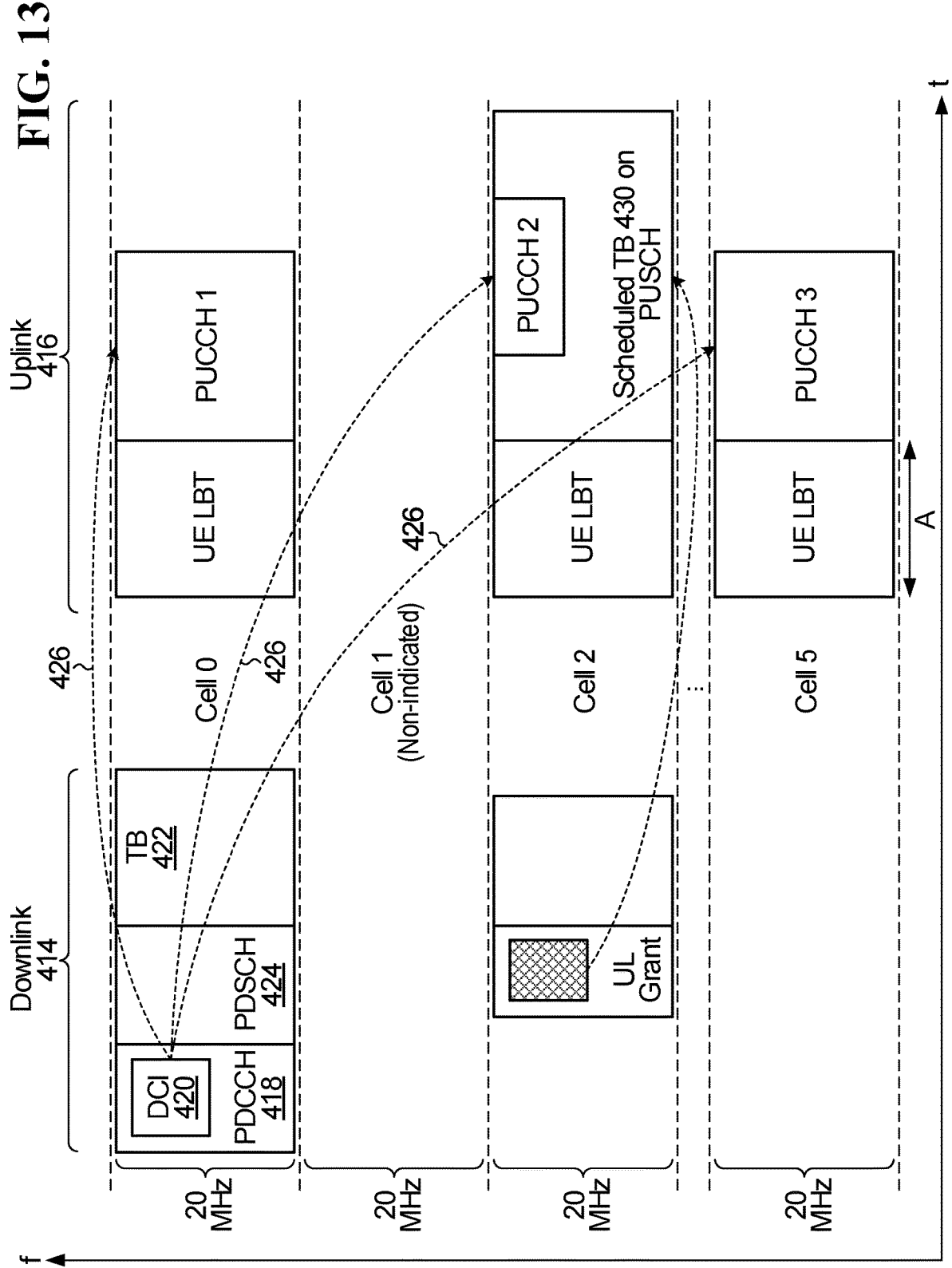

FIG. 13 illustrates a variation of FIG. 9 in which the base station 170 indicates a PUCCH resource on a cell during a time slot in which the base station 170 has also scheduled the UE 110 to transmit a TB on a PUSCH. In FIG. 13, PUCCH 2 is allocated during the same time slot and on the same cell as the uplink transmission of TB 430. Different actions may be taken by the UE 110. In some embodiments, UE 110 might not transmit the UCI on PUCCH 2. In some embodiments, the UE 110 might not transmit the UCI on PUCCH 2, but rather transmit the UCI in cell 2 as a payload on the scheduled PUSCH after rate matching, if the indicated PUCCH resource and the scheduled PUSCH at least share the same starting symbol. In some embodiments, the base station 170 may blindly detect the PUCCH/UCI on the PUSCH on each of the indicated CCs that has a PUSCH.

The embodiments explained above in relation to FIGS. 9 to 13 have the following technical benefit: PUCCH resources are pre-configured and may be made available on SCells for the base station 170 to dynamically provide more frequency-domain opportunities for the UE 170 to transmit critical UCI in an LBT-resilient manner, even if wideband carriers/wideband uplink BWPs are not configured.

Dynamic Indication Signaling Mechanisms

In some embodiments, a cross-carrier PUCCH indication bitmap may be included in the DCI scheduling the PDSCH, e.g. in DCI 420, in order to indicate to the UE 110 which cells out of the active cell group are intended for a PUCCH resource allocation.

In some embodiments, the bitwidth of the cross-carrier PUCCH indication bitmap depends on the maximum index that can be indicated in the carrier indicator field (CIF) in the DCI formats used for cross-carrier scheduling. For example, in DCI format 1_1 the CIF has 3 bits, and therefore in some embodiments the cross-carrier PUCCH indication bitmap is 8 bits when DCI format 1_1 is used: one bit for each of the 8 possible CCs/cells. In some embodiments, the most significant bit (MSB) of the cross-carrier PUCCH indication bitmap may correspond to carrier indicator (CI) CI=0, and the least significant bit (LSB) may correspond to CI=7.

Figure 14:
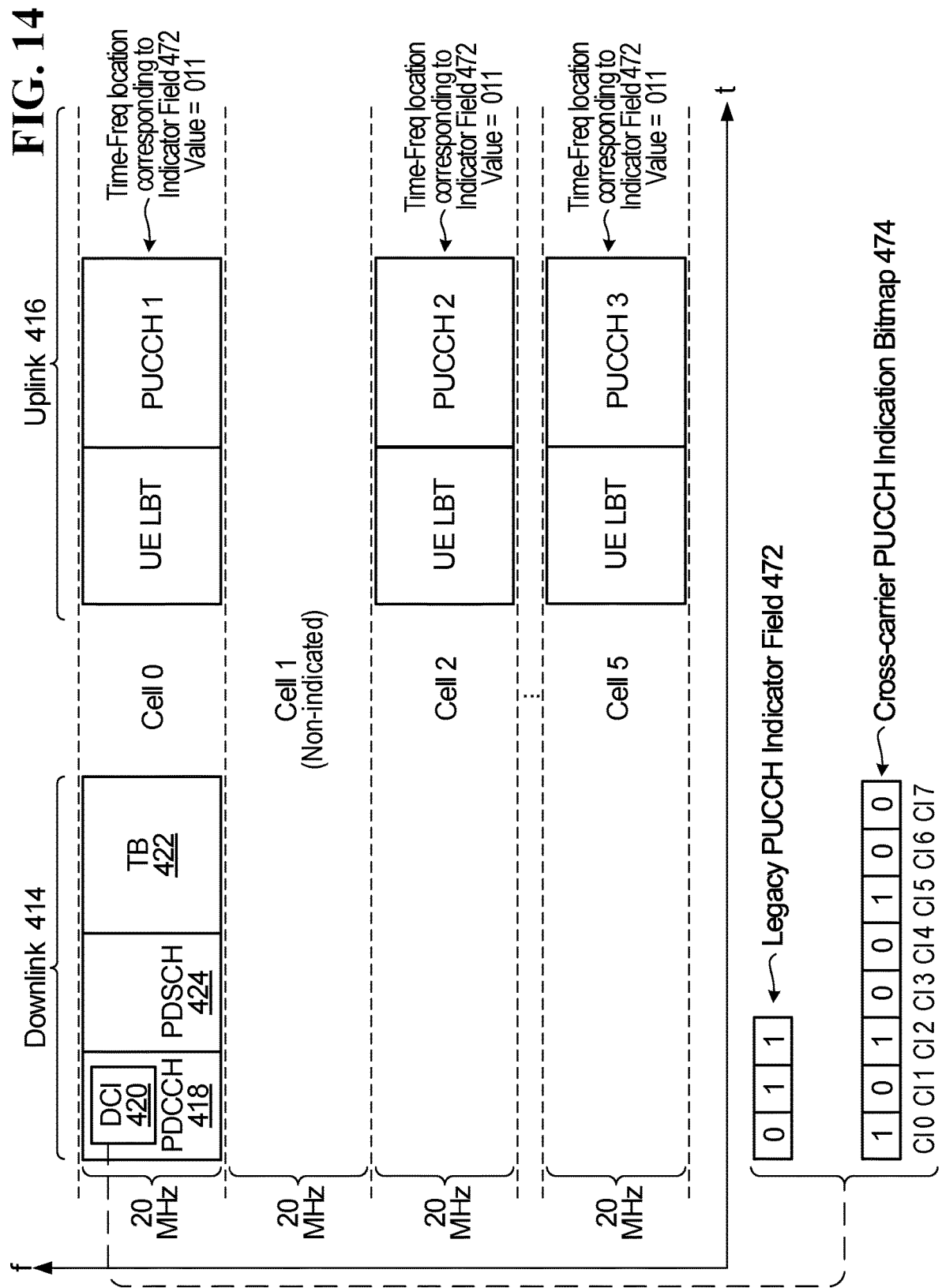
FIGS. 14 and 15 illustrate example ways to dynamically allocate multiple uplink control channel resources for a UE.

In some embodiments, the value of the legacy 3-bit PUCCH resource indicator field can be used and propagated to all the cells indicated in the cross-carrier PUCCH indication bitmap. FIG. 14 illustrates an example of a legacy 3-bit PUCCH resource indicator field 472 and a cross-carrier PUCCH indication bitmap 474, according to one embodiment. In the example in FIG. 14, the cells in which a PUCCH resource is indicated are cells 0, 2, and 5, as indicated by the presence of '1' in the positions in the bitmap 474 that correspond to cells 0, 2, and 5. The PUCCH resource actually allocated in each of cells 0, 2, and 5, is indicated by the legacy 3-bit PUCCH resource indicator field 472. In the example in FIG. 14, the PUCCH resource allocated is the PUCCH resource indicated by '011'. Another bit value in indicator field 472 would indicate another allocated PUCCH resource.

The value indicated in the PUCCH resource indicator field 472 maps to a corresponding allocated PUCCH resource within the PUCCH resource set, e.g. that the UE has identified based on the UCI size and the number of symbols to be transmitted. In case the PUCCH resource set size is larger than the indicator field capability, the indicator field value may map to an allocated combination of PUCCH resources within the PUCCH resource set through a pre-defined rule, e.g., 1st+5th, 2nd+6th, etc.

By using the legacy PUCCH resource indicator field 472, control overhead may be saved because the same PUCCH resource is being allocated in each cell indicated in the cross-carrier PUCCH indication bitmap 474. The embodiment illustrated in FIG. 14 may be useful when the base station configures the UE 110 with identical PUCCH resource sets over the cell group or informs the UE 110 to apply one cell configuration to all other cells of the same bandwidth in the cell group.

Figure 15:
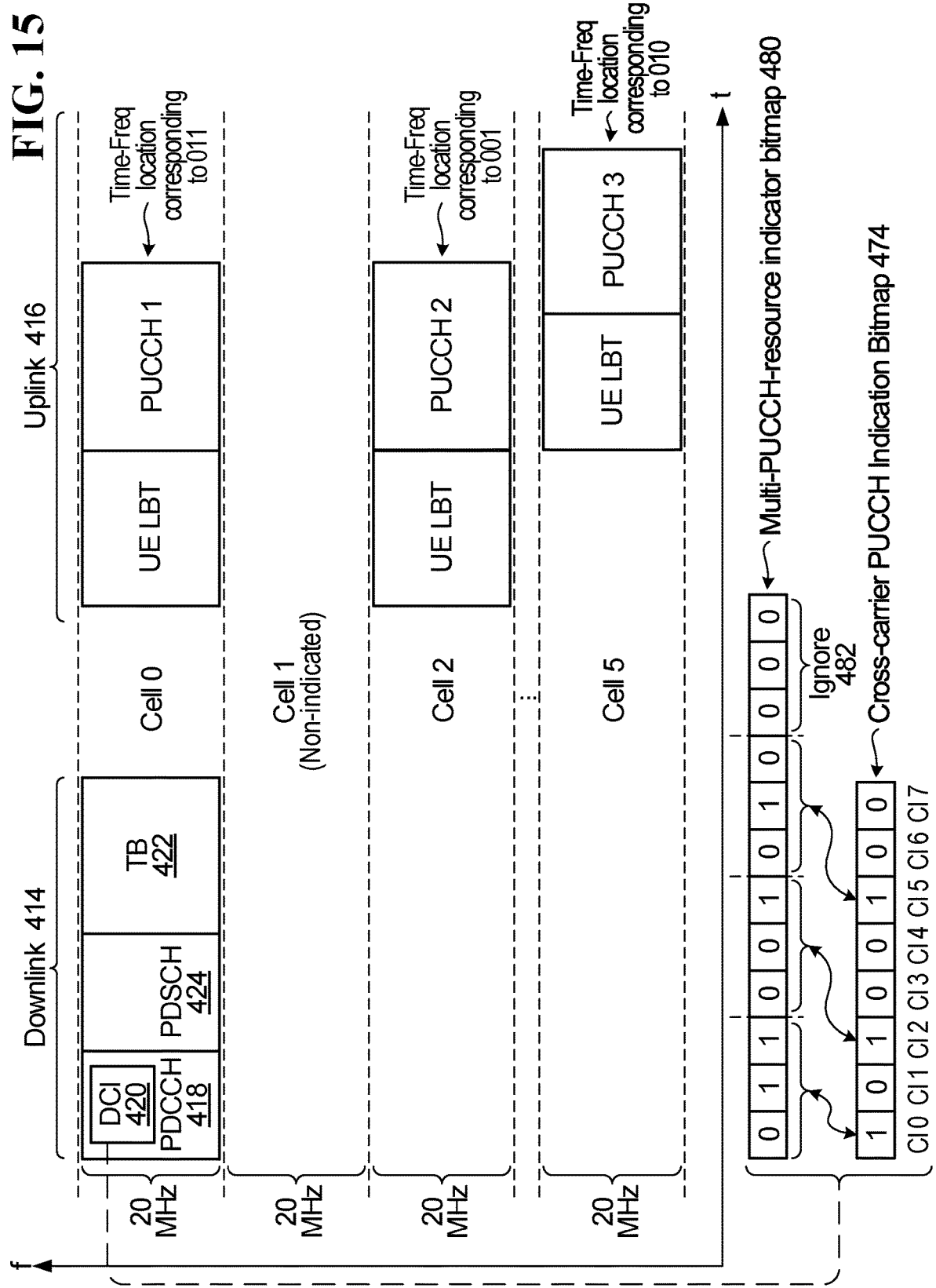

In other embodiments, the legacy PUCCH resource indicator field 472 is not used. Rather, a multi-PUCCH-resource indicator bitmap is used, which in some embodiments has a bitwidth that depends on the maximum number of PUCCH resources that the base station 170 could possibly indicate simultaneously to the UE 110. In some embodiments, the order of the indicator fields from MSB to LSB may follow the order of indicated cells in the frequency domain. FIG. 15 illustrates an example multi-PUCCH-resource indicator bitmap 480, which has four PUCCH resource indicator fields of three bits each. The bitwidth of the multi-PUCCH-resource indicator bitmap 480 is therefore 12 bits, and a maximum of four PUCCH resources can be indicated. In the example in FIG. 15, each field of three bits in the multi-PUCCH-resource indicator map 480 indicates a respective PUCCH resource, and the cross-carrier PUCCH indication bitmap 474 indicates the cells on which the PUCCH resources are indicated. In the example in FIG. 15, a PUCCH resource is indicated in cells 0, 2, and 5, as indicated by the presence of '1' in the positions in the bitmap 474 that correspond to cells 0, 2, and 5. The PUCCH resource actually allocated in each of cells 0, 2, and 5 is indicated by the respective 3-bit field value in the respective field of the multi-PUCCH-resource indicator bitmap 480. A different resource indicator (RI) value is indicated for each of cells 0, 2, and 5. In the specific example illustrate in FIG. 15, the RI value 011 is indicated for cell 0, the RI value 001 is indicated for cell 2, and the RI value 010 is indicated for cell 5. The different RI values map to different PUCCH resources, which may be at different time-frequency partitions, as illustrated in FIG. 15.

In the embodiment illustrated in FIG. 15, the bitwidth and field sizes may be fixed to reduce the complexity and energy of the blind decoding of the DCI at the UE side. Therefore, resource indicator fields in the multi-PUCCH-resource indicator bitmap 480 that correspond to cells that are not intended for PUCCH resource allocation are ignored by the UE 110. The example in FIG. 15 shows the last field/partition 482 of 3-bits in the multi-PUCCH-resource indicator bitmap 480 being set to all zeros. These bits can be ignored and are not applicable because only three of maximum four cells have been allocated a PUCCH.

The use of a multi-PUCCH-resource indicator bitmap 480, e.g. as in FIG. 15, provides the base station 170 with flexibility to allocate different PUCCH resources across the indicated cells. However, this flexibility is at the expense of additional signaling overhead.

A multi-PUCCH-resource indicator bitmap 480, e.g. as in FIG. 15, may be useful in the following situations:
 (1) carriers/active BWPs thereof are not configured with identical PUCCH resource sets; and/or
 (2) carriers/active BWPs thereof are not of the same bandwidth and/or the same numerology; and/or
 (3) additional frequency domain opportunities are to be used for transmission of additional/pending UCI.

In an alternative embodiment, the multi-PUCCH-resource indicator bitmap 480 may dynamically vary in size based on the number of cells indicated. For example, the multi-PUCCH-resource indicator bitmap 480 might not include the last three bits 000 in the example illustrated in FIG. 15 because no cell is indicated corresponding to these bits.

In another alternative embodiment, the multi-PUCCH-resource indicator bitmap 480 may be combined with the cross-carrier PUCCH indication bitmap 474, e.g. to have a single bitmap. For example, a single bitmap may be used having eight fields of three bits each. Each three-bit field may correspond to a respective one of the cells, and a field having all three bits set to zero may indicate that no PUCCH is indicated on that cell. As another example, a single bitmap may be used having three fields only of three bits each, and the UE maps the $1^{st}$ field to a $1^{st}$ active cell, the $2^{nd}$ field to a $2^{nd}$ active cell, etc. In some embodiments, the bitmap may have a fixed size of four fields of 3 bits each, and the UE performs the same mapping ($1^{st}$ field to a $1^{st}$ active cell, $2^{nd}$ field to a $2^{nd}$ active cell, etc.), but if only three cells are active, a reserved value is indicated in the last (4th) field. The base station may or may not have flexibility in selecting which active cells to indicate.

The embodiments explained above in relation to FIGS. 14 and 15 may have the following technical benefit: relatively compact indication in DCI with options exploiting the trade-off between signaling overhead and flexible resource allocation.

Channel Access and Collision Avoidance/Improved Resource Utilization

To avoid wasting resources, the base station 170 may allocate a given PUCCH resource to more than one UE. In some embodiments, to try to avoid collisions, UEs may be configured with different offsets for uplink starting time on each of the multiple cells containing PUCCH resources. Therefore, the likelihood/priority for an uplink transmission to occur on a given cell generally decreases as the time offset increases.

For example, in some embodiments, different cells may be prioritized per UE by configuring different offsets for the uplink transmission start of the UE's uplink transmission on each cell. When an offset is applied on a cell, the start of the uplink transmission on that cell is offset from the pre-configured start of the PUCCH time-frequency resource allocated to that UE on that cell. The offset may be implemented in different ways. In one implementation: the offset corresponding to a particular cell indicates the start time of the uplink transmission on that cell such that the start time is later than the pre-configured start of the PUCCH time-frequency resources allocated to that UE on that cell if the offset is non-zero; the LBT listening period occurs prior to the start time and ends at the start time; if the channel is unoccupied at the end of the LBT listening period, then the uplink transmission of the UCI on the PUCCH may be sent.

Different offset values correspond to different priorities. When offsets are used, the UE 110 will typically transmit on the first PUCCH resource that is available for use, i.e., the available PUCCH with the shortest time offset. An available PUCCH is determined by a successful LBT. For example, if in the example of FIG. 9 the UE 110 determines that the frequency regions of cells 0, 2, and 5 are all unoccupied, but UE 110 is preconfigured using offsets to have to start a potential uplink transmission of PUCCH 3 (in cell 5) one or more OFDM symbols after the start of a potential uplink transmission of PUCCH 1 (in cell 0), then the UE 110 may send the uplink transmission on PUCCH 1 first because the LBT subband of cell 0 is available to the UE 110 first. The offset values may have smaller time granularity than an OFDM symbol, such as the CCA slot duration, e.g., 9 μs in the 5 GHz band. In the case of an offset of a non-integer symbol duration, CP extensions may be used to allow for starting the transmission between the OFDM symbol boundaries.

In some embodiments, different cells may be prioritized by setting in DCI 420 different LBT priority classes/access categories for each cell, which ultimately affects how long the UE 110 needs to listen using CAT4 LBT before being able to send the uplink transmission. For example, if UE 110 was configured to listen longer in the frequency region of cell 5 than in the frequency region of cell 0, i.e. time period A in FIG. 9 was longer for cell 0 than for cell 5, then the UE 110 may just send the uplink transmission on PUCCH 1 first.

In some embodiments, the UE 110 performs LBT independently on each cell, possibly in parallel, e.g. as illustrated in FIGS. 9 and 10 during time period A. In other embodiments, the UE 110 performs hierarchical LBT, e.g. like in (e)LAA LBT type B for downlink. For example, during time period A in FIG. 9, the UE 110 may first listen only on the frequency region of cell 0 to determine whether the channel is unoccupied. If the UE 110 determines the wireless channel is unoccupied on the frequency region of cell 0, then just before the UE 110 finishes the LBT period, the UE 110 checks the frequency region of each of cells 2 and 5 for a short period of time. If the UE 110 determines that the subbands of one or more other cells are also unoccupied, then the UE 110 may acquire not just the allocated PUCCH in cell 0, but also the allocated PUCCH of one or more other unoccupied cells. In this case, for instance, additional ACK/NACK feedback that is pending for HARQ processes transmitted in previous downlink bursts may be sent in the acquired other PUCCHs.

In some embodiments, collisions between the PUSCH/PUCCH transmissions of different UEs on the same selected frequency region/cell may be mitigated or avoided using orthogonal frequency interlaces. PUCCH collisions may also or instead be tolerated using orthogonality in the code domain, e.g. through the use of orthogonal cover codes.

In some embodiments, load balancing across cells may be achieved by controlling the priority of PUCCH transmission through time offsets. In some embodiments, code-domain multiplexing of multiple UEs on the same PUCCH resource on a given cell may be allowed by the base station 170 assigning the same time offset to the multiple UEs.

In some embodiments, the UE 110 may acquire more than one cell for UCI transmission. An example is shown in FIG. 10, in which the UE 110 determines that both the cell 2 LBT subband and the cell 5 LBT subband are unoccupied, and therefore PUCCH 2 and PUCCH 3 are both possibly available to transmit the UCI. In some embodiments, if the UE 110 acquires more than one cell for UCI transmission, e.g. as in FIG. 10, then the UE 110 may be configured to execute one of the following rules:

(1) The UE 110 may apply a pre-set priority order to select one cell for UCI transmission. For example, the UE 110 may prioritize transmitting the UCI in PUCCH 2 over PUCCH 3 in FIG. 10.

(2) The UE 110 may transmit additional UCI on the additional unoccupied cell or cells. For example, the UE 110 may transmit the HARQ feedback from TB 422 in PUCCH 2 in FIG. 10, and the UE 110 may transmit pending HARQ feedback from an earlier PDSCH transmission in PUCCH 3 in FIG. 10. The earlier PDSCH transmission may have been sent in an earlier COT.

(3) The UE 110 may repeat the transmission of the UCI in different cells to try to improve reliability. For example, the UE 110 may transmit the HARQ feedback from TB 422 in both PUCCH 2 and PUCCH 3 in FIG. 10 to try to achieve improved reliability.

In some embodiments, before the UE 110 transmits the UCI on an indicated PUCCH resource, the UE 110 performs an LBT procedure on the respective indicated cell according to one or more of:

(1) A pre-configured multi-channel access procedure using parallel Type 1 or Type 2 channel access (or LBT) procedures as in Rel-15 FeLAA TS 37.213; and/or (2) An indication from the base station 170 that indicates channel occupancy/COT sharing on the respective indicated cell; and/or (3) The UE's channel occupancy on the respective indicated cell.

Example Channel Access Procedures

Figure 16:
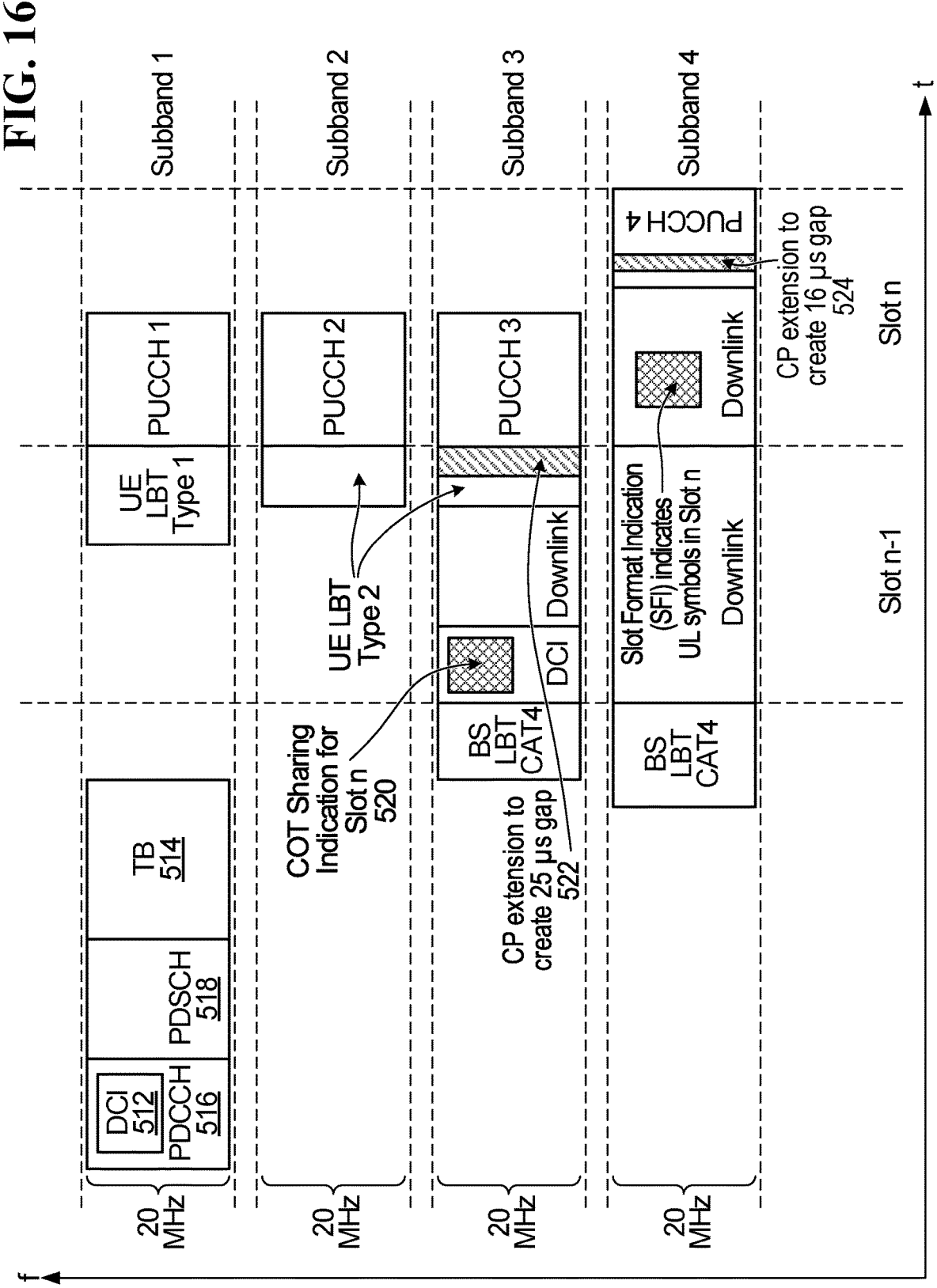
FIGS. 16 and 17 illustrate examples of multiple uplink control channel resources allocated on multiple listen-before-talk (LBT) subbands.

FIG. 16 illustrates multiple PUCCH resources allocated on multiple LBT subbands, according to one embodiment. Four LBT subbands are illustrated and respectively labelled as subband 1, subband 2, subband 3, and subband 4. Each LBT subband may be on a different CC/cell, although this is not necessary. For example, in some embodiments, the LBT subbands may all be in a same activated cell, e.g. a single wideband CC. In some other embodiments, two or more of the LBT subbands may be on the same cell. It should be noted that for the purpose of illustrating the channel access procedures herein, allocating multiple PUCCH resources on multiple LBT subbands is not necessary, e.g., only one PUCCH resource may be allocated on one of subband 1, subband 2, subband 3, or subband 4.

A DCI 512 in a PDCCH 516 on subband 1 schedules a TB 514 in a PDSCH 518 in subband 1. The DCI 512 also indicates an uplink resource partition on which UCI may be sent. In this example four uplink resource partitions are indicated. Specifically, the DCI 512 allocates four PUCCHs for sending HARQ feedback corresponding to the TB 514. The four PUCCHs are each on a respective different one of the subbands. PUCCH 1 is allocated on uplink time-frequency resources in subband 1, PUCCH 2 is allocated on uplink time-frequency resources in subband 2, PUCCH 3 is allocated on uplink time-frequency resources in subband 3, and PUCCH 4 is allocated on uplink time-frequency resources in subband 4.

On subband 1, the UE 110 uses default LBT Type 1 with the smallest channel access priority class (CAPC) value, i.e. highest priority, for transmission of the PUCCH 1 only, unless a field indicating a PUCCH LBT type is added to the DCI 512.

On subband 2, the UE 110 may use LBT Type 2 if performed immediately before the UE's transmission on subband 1 for which LBT Type 1 has been used. More generally, the UE 110 may use LBT Type 2 to access a subband/cell j if the LBT Type 2 is performed immediately before the UE's transmission on a PUCCH on subband/cell i for which Type 1 has been used, and the resource indicated for both transmissions start at the same point. The UE 110 may select a subband/cell i uniformly randomly before LBT Type 1 is performed.

On subband 3, a COT sharing indication for slot n may be transmitted along with the indicated PUCCH resource. In some embodiments, the COT sharing indication may be sent in DCI that is transmitted in slot n−1 or an earlier slot in subband 3, as shown at 520 in FIG. 16. In some embodiments, LBT Type 2 may be used during the symbol(s) preceding the uplink transmission regardless of the base station CAT4 priority class. In some embodiments, a cyclic prefix (CP) extension may be used to create a 25 μs gap so that LBT Type 2 may be used, e.g. as shown at 522 in FIG. 16 using hatching. It should be noted that for dynamically scheduled uplink transmission(s), the UE may determine the duration of the CP extension based on its time alignment (TA) value in conjunction with the SCS configured for the BWP of the respective LBT subband such that the duration of the CP extension does not exceed one OFDM symbol duration. The configuration illustrated in subband 3 is an example of the following situation: upon receipt of a COT sharing indication, the UE switches from LBT Type 1 and instead uses LBT Type 2 for the PUCCH 3, because the PUCCH 3 resource is during the base station's channel occupancy time and therefore the longer random LBT Type 1 listening period is not needed by the UE. Because there is a switch from the downlink base station transmission to the uplink PUCCH 3 transmission, a gap exists between the downlink and the uplink. The gap duration is not equal to the duration of an integer number of one or more OFDM symbols, and the gap duration is therefore implemented by applying the CP extension to the first uplink OFDM symbol transmission of the PUCCH 3. The CP extension is thus a time-continuous signal preceding the first OFDM symbol for PUCCH 3. In some embodiments, the CP extension may be indicated by the DCI, e.g. by DCI 512 or DCI 520. In the example in subband 3, the gap is 25 μs.

On subband 4, a slot format indication (SFI) is transmitted to the UE in the downlink, e.g. in DCI. The SFI indicates that there are uplink symbols in slot n. The UE transmits the PUCCH 4 in the uplink symbols. The UE 110 may not need to perform LBT sensing, i.e., uses CAT1 variation of Type 2 LBT when: (i) the indicated PUCCH 4 resource falls in a self-contained slot, i.e., a slot comprising downlink symbols, switching gap, and uplink symbols; or (ii) the base station 170 indicates a gap of 16 μsec in the symbol(s) preceding the uplink transmission of PUCCH 4, e.g., the last symbol of slot n−1 in this example. However, collision may occur because the UE 110 does not perform LBT sensing. In some embodiments, CP extension may be used to create a 16 μs gap so that LBT sensing does not need to be used, e.g. as shown at 524 in FIG. 16 using hatching. The configuration illustrated in subband 4 is an example of the following situation: upon receipt of a SFI indicating uplink symbols, the UE switches from LBT Type 1 and instead uses LBT Type 2 for the PUCCH 4, because the PUCCH 4 resource is during the uplink symbols of the base station's channel occupancy time and therefore the longer random LBT Type 1 listening period is not needed by the UE. Because there is a switch from the downlink base station transmission to the uplink PUCCH 4 transmission, a gap exists between the downlink and the uplink. The gap duration is not equal to the duration of an integer number of one or more OFDM symbols, and the gap duration is therefore implemented by applying the CP extension to the first uplink OFDM symbol transmission of the PUCCH 4. The CP extension is thus a time-continuous signal preceding the first OFDM symbol for PUCCH 4. In some embodiments, the CP extension may be indicated by the DCI, e.g. by DCI 512 or by DCI transmitted in subband 4.

FIG. 16 illustrates various possibilities, with each one shown on a respective different subband. Other variations are possible. For example, a 16 μs gap may be implemented on subband 3 instead of a 25 μs gap, and/or a 25 μs gap may be implemented on subband 4 instead of a 16 μs gap.

Figure 17:
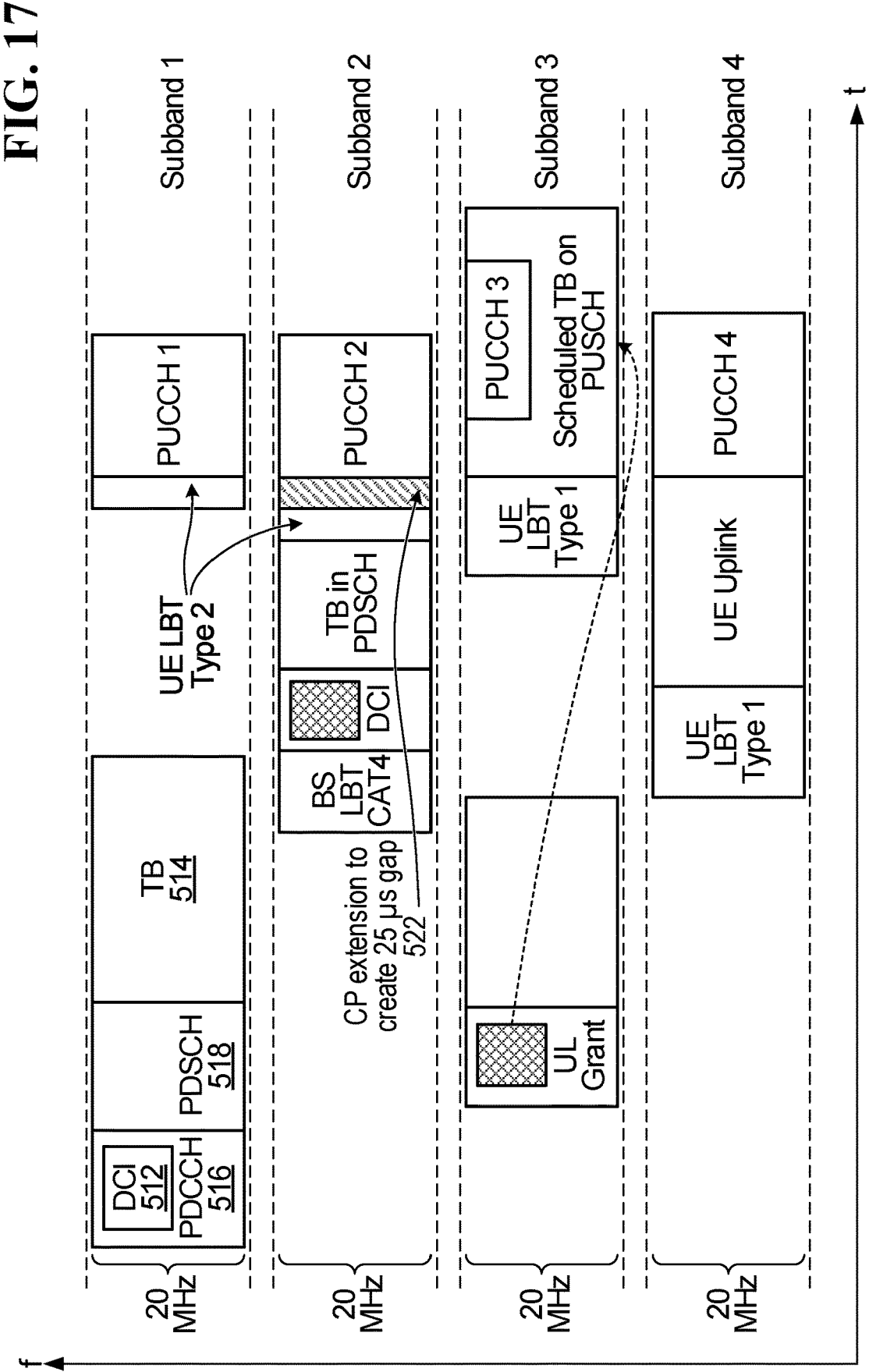

FIG. 17 illustrates multiple PUCCH resources allocated on multiple LBT subbands, according to another embodiment. Four LBT subbands are illustrated and respectively labelled as subband 1, subband 2, subband 3, and subband 4. Each LBT subband may be on a different CC/cell, although this is not necessary. For example, in some embodiments, the LBT subbands may all be in a same activated cell, e.g. a single wideband CC. In some other embodiments, two or more of the LBT subbands may be on the same cell. It should be noted that for the purpose of illustrating the channel access procedures herein, allocating multiple PUCCH resources on multiple LBT subbands is not necessary, e.g., only one PUCCH resource may be allocated on one of subband 1, subband 2, subband 3, or subband 4.

A DCI 512 in a PDCCH 516 on subband 1 schedules a TB 514 in a PDSCH 518 in subband 1. The DCI 512 also indicates an uplink resource partition on which UCI may be sent. In this example four uplink resource partitions are indicated. Specifically, the DCI 512 allocates four PUCCHs for sending HARQ feedback corresponding to the TB 514. The four PUCCHs are each on a respective different one of the subbands. PUCCH 1 is allocated on uplink time-frequency resources in subband 1, PUCCH 2 is allocated on uplink time-frequency resources in subband 2, PUCCH 3 is allocated on uplink time-frequency resources in subband 3, and PUCCH 4 is allocated on uplink time-frequency resources in subband 4.

On subband 1, a field indicating a PUCCH LBT type indicates LBT Type 2 to the UE 110 for all indicated PUCCH resources on subband 1. If no such indication is provided in the DCI, the UE 110 applies default LBT type 1 along with the default priority class.

On subband 2, even though the UE 110 is supposed to use LBT Type 1, e.g., by default, because a downlink transmission (PDSCH) is received in slot n−1 on subband 2 in conjunction with the indicated PUCCH 2 resource, the UE 110 therefore uses LBT Type 2 instead during the last blanked symbol(s) in the downlink transmission. In some embodiments, a CP extension may be used to create a 25 μs gap so that LBT Type 2 may be used, e.g. as shown at 522 in FIG. 17 using hatching. It should be noted that for dynamically scheduled uplink transmission(s), the UE may determine the duration of the CP extension based on its time alignment (TA) value in conjunction with the SCS configured for the BWP of the respective LBT subband such that the duration of the CP extension does not exceed one OFDM symbol duration. The configuration illustrated in subband 2 is an example of the following situation: the UE switches from LBT Type 1 and instead uses LBT Type 2 for the PUCCH 2, because the PUCCH 2 resource is during the base station's channel occupancy time and therefore the longer random LBT Type 1 listening period is not needed by the UE. Because there is a switch from the downlink base station transmission to the uplink PUCCH 2 transmission, a gap exists between the downlink and the uplink. The gap duration is not equal to the duration of an integer number of one or more OFDM symbols, and the gap duration is therefore implemented by applying the CP extension to the first uplink OFDM symbol transmission of the PUCCH 2. The CP extension is thus a time-continuous signal preceding the first OFDM symbol for PUCCH 2. In some embodiments, the CP extension may be indicated by the DCI, e.g. by DCI 512 or the DCI scheduling the TB in the PDSCH in subband 2. In the example in subband 2, the gap is 25 μs.

On subband 3, the UE 110 follows the LBT type indicated in the DCI scheduling the TB in the PUSCH in slot n, i.e., irrespective of the indicated LBT type in DCI 512. The UE may multiplex the UCI on the overlapping scheduled PUSCH in slot n instead of transmitting PUCCH 3 on the indicated uplink resource partition. Priority class for Type 1 corresponds to the PUSCH scheduled in slot n in subband 3.

On subband 4, the UE 110 continues transmission without LBT because no gaps exist between the consecutive uplink transmissions within the UE's COT. In some embodiments, the total COT duration does not exceed the maximum COT (MCOT) corresponding to the priority class of UE's LBT Type 1 used for acquiring the uplink COT.

Interpreting feedback timing when the indicated resources are configured with different SCSs In some embodiments, a PUCCH slot index is provided by a PDSCH-to-HARQ-timing-indicator field in the DCI scheduling the PDSCH. There may be a one-to-one mapping between the value of the PDSCH-to-HARQ-timing-indicator and the slot index.

In some embodiments, the slot indices are pre-defined, e.g., for indication using DCI format 1_0. In some embodiments, the slot indices are configured using RRC signaling, e.g., for indication using DCI format 1_1. For a slot which has been determined by the PDSCH-to-HARQ-timing-indicator, the UE transmits HARQ feedback bits on the PUCCH or PUSCH.

In some embodiments, when the allocated PUCCH resources correspond to uplink BWPs configured with different numerologies, e.g., different SCSs, then the UE 110 acts according to the following:

(1) The PDSCH-to-HARQ-timing-indicator value, and thus the time interval, in slots, to the slot containing the HARQ feedback transmission, corresponds to the SCS configured for a first uplink BWP that is unpaired with the downlink BWP of a first cell on which the indicating DCI is sent.

(2) To align the starting boundary of the slot containing the HARQ feedback on a second uplink BWP, e.g., on a second indicated cell, in which the second uplink BWP may be configured with a different SCS, the time interval (in number of slots) above to the slot containing the HARQ transmission is scaled by the ratio of the SCS of the second uplink BWP to the SCS of the first cell.

Example Methods

Figure 18:
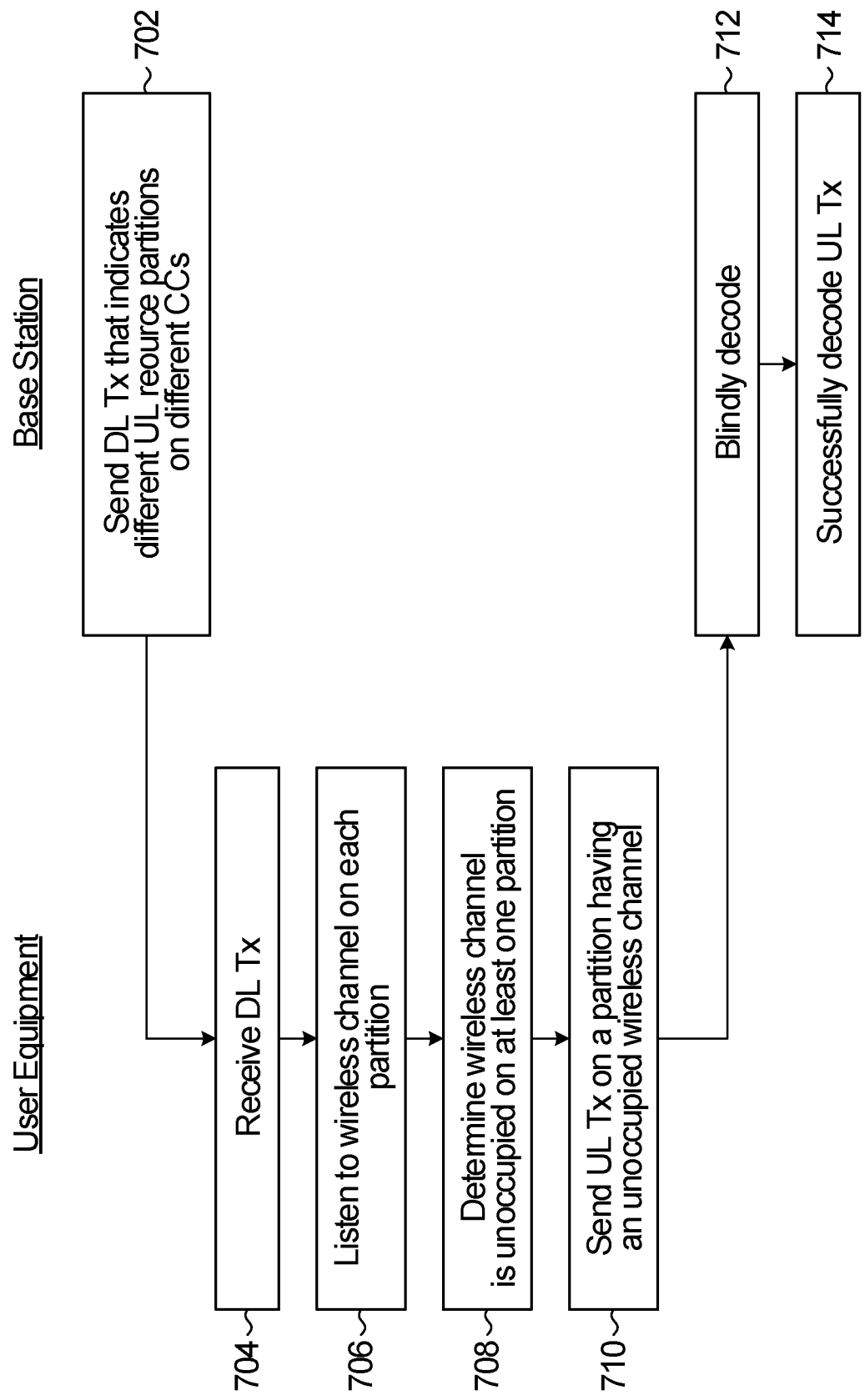
FIG. 18 is an example method performed by a user equipment and base station.

FIG. 18 is an example method performed by a base station and a UE. In step 702, the base station sends a downlink transmission that indicates a plurality of uplink resource partitions on which an uplink transmission may be sent. Each uplink resource partition of the plurality of uplink resource partitions is on a respective different CC in unlicensed spectrum. The plurality of uplink resource partitions may be uplink time-frequency resource partitions. An example of uplink resource partitions are the PUCCHs described earlier. In some embodiments, the downlink transmission may indicate one or more other uplink resource partitions on which the uplink transmission may be sent, and these one or more other uplink resource partitions are not necessarily on respective different CCs.

In step 704, the UE receives the downlink transmission. In step 706, for each uplink resource partition, the UE listens to a wireless channel in a frequency region of the uplink resource partition to determine whether the wireless channel is unoccupied in the frequency region of the uplink resource partition. As an example, the listening may be performed during the LBT periods described earlier that precede a PUCCH resource.

In step 708, the UE determines that the wireless channel is unoccupied in the frequency region of at least one of the partitions. In step 710, the UE transmits the uplink transmission in at least one of the uplink resource partitions for which the frequency region of the wireless channel is unoccupied.

In step 712, the base station attempts blind decoding on the plurality of uplink resource partitions to obtain the uplink transmission on at least one of the plurality of uplink resource partitions. In step 714, the base station successfully decodes the uplink transmission sent by the UE on at least one uplink resource partition having an unoccupied wireless channel.

In some embodiments, the uplink transmission that is transmitted by the UE and decoded by the base station comprises UCI, e.g. HARQ feedback corresponding to a downlink TB. For example, the UCI may be HARQ feedback for TB 422 of FIG. 9.

In some embodiments, the downlink transmission includes DCI that indicates the plurality of uplink resource partitions. An example is DCI 420 in FIG. 9, which indicates PUCCH 1, PUCCH 2, and PUCCH 3.

In some embodiments, the uplink transmission is scheduled on a control channel, e.g. a PUCCH.

In some embodiments, at least some of the plurality of uplink resource partitions overlap with each other in time, and do not overlap in frequency. An example is PUCCHs 1, 2, and 3 in FIG. 9, which overlap in time but not in frequency because they are on different CCs.

In some embodiments, the method includes the UE determining that the wireless channel is unoccupied in the frequency region of at least two of the uplink resource partitions, and selecting one of the at least two uplink resource partitions on which to transmit the uplink transmission. An example is FIG. 10 in which the wireless channel on which PUCCH 2 is allocated and the wireless channel on which PUCCH 3 is allocated is unoccupied, and so at least one of PUCCH 2 and PUCCH 3 may be used to send the uplink transmission.

In some embodiments, the method includes the UE determining that the wireless channel is unoccupied in the frequency region of at least two of the uplink resource partitions, and the UE transmitting the uplink transmission including additional uplink control information and/or uplink data on the at least two uplink resource partitions. For example, in FIG. 10 the UE 110 may transmit HARQ feedback corresponding to TB 422 in PUCCH 2 and may transmit additional UCI in PUCCH 3. In some embodiments, the additional UCI may be HARQ feedback corresponding to one or more downlink TBs transmitted in one or more COTs earlier than a COT in which the UE received the downlink transmission.

In some embodiments, the LBT protocol used by the UE to listen to the wireless channel in the frequency region of a first uplink resource partition is different from the LBT protocol used to listen to the wireless channel in the frequency region of a second uplink resource partition. For example, in FIG. 16 LBT Type 1 is used on one subband, and LBT Type 2 is used on another subband.

In some embodiments, the downlink transmission may include a bitmap indicating particular component carriers for which the plurality of uplink resource partitions are allocated. The particular component carriers may be selected from a larger set of component carriers. Each component carrier of the particular component carriers may be allocated a respective different one of the uplink resource partitions. An example is cross-carrier PUCCH indication bitmap 474 in FIGS. 14 and 15. In some embodiments, the downlink transmission indicates a time-frequency resource partition on which the uplink transmission may be sent for each component carrier of the particular component carriers. An example is legacy indicator field 472 in FIG. 14. Another example is multi-PUCCH-resource indicator bitmap 480 in FIG. 15.

EXAMPLES

In view of, and in addition to the above, the following examples are disclosed.

Example 1

A method performed by a UE, the method comprising: receiving a downlink transmission indicating a plurality of uplink resource partitions on which an uplink transmission may be sent, each uplink resource partition of the plurality of uplink resource partitions being on a respective different component carrier in unlicensed spectrum; for each uplink resource partition of the plurality of uplink resource partitions: listening to a wireless channel in a frequency region of the uplink resource partition to determine whether the wireless channel is unoccupied in the frequency region of the uplink resource partition; transmitting the uplink transmission in at least one of the uplink resource partitions for which the frequency region of the wireless channel is unoccupied.

Example 2

The method of example 1, wherein the uplink transmission comprises uplink control information (UCI).

Example 3

The method of example 2, wherein the UCI is hybrid automatic repeat request (HARQ) feedback corresponding to a downlink transport block (TB).

Example 4

The method of any one of examples 1 to 3, wherein the downlink transmission includes downlink control information (DCI) that indicates the plurality of uplink resource partitions.

Example 5

The method of any one of examples 1 to 4, wherein the uplink transmission is scheduled on a control channel.

Example 6

The method of any one of examples 1 to 5, wherein at least some of the plurality of uplink resource partitions overlap with each other in time, and do not overlap in frequency.

Example 7

The method of any one of examples 1 to 6, comprising determining that the wireless channel is unoccupied in the frequency region of at least two of the uplink resource partitions, and selecting one of the at least two uplink resource partitions on which to transmit the uplink transmission.

Example 8

The method of any one of examples 1 to 6, comprising determining that the wireless channel is unoccupied in the frequency region of at least two of the uplink resource partitions, and transmitting the uplink transmission including additional uplink control information and/or uplink data on the at least two uplink resource partitions.

Example 9

The method of example 8, wherein the additional uplink control information comprises HARQ feedback corresponding to one or more downlink transmit blocks transmitted in one or more channel occupancy times (COTs) earlier than a COT in which the UE receives the downlink transmission.

Example 10

The method of any one of examples 1 to 9, wherein a listen-before-talk (LBT) protocol used to listen to the wireless channel in the frequency region of a first uplink resource partition is different from the LBT protocol used to listen to the wireless channel in the frequency region of a second uplink resource partition.

Example 11

The method of example 10, wherein LBT Type 1 is used to listen to the wireless channel in the frequency region of the first uplink resource partition, and wherein LBT Type 2 is used to listen to the wireless channel in the frequency region of the second uplink resource partition.

Example 12

The method of any one of examples 1 to 11, wherein the downlink transmission includes a bitmap indicating particular component carriers for which the plurality of uplink resource partitions are allocated, wherein the particular component carriers are selected from a larger set of component carriers, and wherein a respective different one of the uplink resource partitions is allocated to each component carrier of the particular component carriers.

Example 13

The method of example 12, wherein the downlink transmission indicates a time-frequency resource partition on which the uplink transmission may be sent for each component carrier of the particular component carriers.

Example 14

The method of example 13, wherein a same indication is used to indicate the time-frequency resource partition on which the uplink transmission may be sent for each component carrier of the particular component carriers.

Example 15

The method of example 13, wherein the bitmap is a first bitmap, and wherein the downlink transmission further includes a second bitmap having a plurality of fields, each field corresponding to a respective component carrier of the particular component carriers, and each field indicating the time-frequency resource partition on which the uplink transmission may be sent on that respective component carrier.

Example 16

A UE comprising: a receiver to receive a downlink transmission indicating a plurality of uplink resource partitions on which an uplink transmission may be sent, each uplink resource partition of the plurality of uplink resource partitions being on a respective different component carrier in unlicensed spectrum; a LBT unit to, for each uplink resource partition of the plurality of uplink resource partitions: listen to a wireless channel in a frequency region of the uplink resource partition to determine whether the wireless channel is unoccupied in the frequency region of the uplink resource partition; a transmitter to transmit the uplink transmission in at least one of the uplink resource partitions for which the frequency region of the wireless channel is unoccupied.

Example 17

A UE configured to perform the method of any one of examples 1 to 15.

Example 18

A UE comprising a processor and a memory; the memory including processor-executable instruction that, when executed by the processor, cause the processor to control the UE to perform the method of any one of examples 1 to 15.

Example 19

A method performed by a base station, the method comprising: transmitting a downlink transmission indicating a plurality of uplink resource partitions on which an uplink transmission may be sent, each uplink resource partition of the plurality of uplink resource partitions being on a respective different component carrier in unlicensed spectrum; performing blind decoding on the plurality of uplink resource partitions to obtain the uplink transmission on at least one of the plurality of uplink resource partitions.

Example 20

The method of example 19, wherein the uplink transmission comprises uplink control information (UCI).

Example 21

The method of example 20, wherein the UCI is hybrid automatic repeat request (HARQ) feedback corresponding to a downlink transport block (TB).

Example 22

The method of any one of examples 19 to 21, wherein the downlink transmission includes downlink control information (DCI) that indicates the plurality of uplink resource partitions.

Example 23

The method of any one of examples 19 to 22, wherein the uplink transmission is scheduled on a control channel.

Example 24

The method of any one of examples 19 to 23, wherein at least some of the plurality of uplink resource partitions overlap with each other in time, and do not overlap in frequency.

Example 25

The method of any one of examples 19 to 24, wherein the downlink transmission includes a bitmap indicating particular component carriers for which the plurality of uplink resource partitions are allocated, wherein the particular component carriers are selected from a larger set of component carriers, and wherein a respective different one of the uplink resource partitions is allocated to each component carrier of the particular component carriers.

Example 26

The method of example 25, wherein the downlink transmission indicates a time-frequency resource partition on which the uplink transmission may be sent for each component carrier of the particular component carriers.

Example 27

The method of example 26, wherein a same indication is used to indicate the time-frequency resource partition on which the uplink transmission may be sent for each component carrier of the particular component carriers.

Example 28

The method of example 26, wherein the bitmap is a first bitmap, and wherein the downlink transmission further includes a second bitmap having a plurality of fields, each field corresponding to a respective component carrier of the particular component carriers, and each field indicating the time-frequency resource partition on which the uplink transmission may be sent on that respective component carrier.

Example 29

A base station comprising: a transmitter to transmit a downlink transmission indicating a plurality of uplink resource partitions on which an uplink transmission may be sent, each uplink resource partition of the plurality of uplink resource partitions being on a respective different component carrier in unlicensed spectrum; a decoder to perform blind decoding on the plurality of uplink resource partitions to obtain the uplink transmission on at least one of the plurality of uplink resource partitions.

Example 30

A base station configured to perform the method of any one of examples 19 to 28.

Example 31

A base station comprising a processor and a memory; the memory including processor-executable instruction that, when executed by the processor, cause the processor to control the base station to perform the method of any one of examples 19 to 28.

Example 32

A method performed by a user equipment (UE), the method comprising: receiving downlink control information (DCI) that indicates: an uplink resource partition in unlicensed spectrum on which uplink control information (UCI) may be sent, and a listen-before-talk (LBT) type to be used in association with the uplink resource partition; performing the LBT type indicated in the DCI; and transmitting the UCI on the uplink resource partition.

Example 33

The method of example 32, wherein the UCI is hybrid automatic repeat request (HARQ) feedback corresponding to a downlink transport block (TB) that is scheduled by the DCI.

Example 34

The method of example 32 or 33, wherein the DCI indicates a CP extension to a first OFDM symbol of an uplink transmission on the uplink resource partition and applied immediately before transmitting the first OFDM symbol of the uplink transmission on the uplink resource partition.

Example 35

The method of example 34, wherein the UE uses the CP extension indicated in the DCI to create a gap of a specific duration from an end of a preceding downlink transmission by a base station to a beginning of the uplink transmission on the uplink resource partition.

Example 36

The method of example 35, wherein the specific duration of the gap is 25 µs or 16 µs, and wherein the UE performs LBT type 2.

Example 37

The method of example 35 or 36, wherein a duration of the CP extension is calculated by the UE based on a time alignment (TA) value and a subcarrier spacing (SCS).

Example 38

The method of example 37, wherein the duration of the CP extension does not exceed one OFDM symbol duration.

Example 39

The method of any one of examples 32 to 38, wherein the DCI indicates LBT type 1, and wherein performing the LBT type indicated in the DCI comprises performing LBT type 2 instead of LBT type 1 in response to receiving a slot format indication (SFI) indicating uplink resources within a base station's channel occupancy, and in response to determining that the indicated uplink resource partition is within the indicated uplink resources.

Example 40

The method of any one of examples 32 to 39, wherein the DCI indicates that LBT type 1 is to be used in association with the uplink resource partition by the absence of an indication, in the DCI, that LBT type 2 is to be used in association with the uplink resource partition.

Example 41

The method of any one of examples 32 to 40, wherein the uplink resource partition is a particular uplink resource partition, wherein the DCI indicates a plurality of uplink resource partitions on which the UCI may be sent, the plurality of uplink resource partitions including the particular uplink resource partition, and wherein the method comprises: performing a respective LBT type for each of the plurality of uplink resource partitions, wherein the LBT type performed for the particular uplink resource partition is the LBT type indicated in the DCI.

Example 42

The method of example 41, wherein each uplink resource partition of the plurality of uplink resource partitions is on a respective different component carrier in the unlicensed spectrum.

Example 43

The method of example 41 or 42, wherein the LBT type performed for one of the plurality of uplink resource partitions is different from the LBT type performed for another one of the plurality of uplink resource partitions.

Example 44

A user equipment (UE) comprising: a receiver to receive downlink control information (DCI) that indicates: an uplink resource partition in unlicensed spectrum on which uplink control information (UCI) may be sent, and a listen-before-talk (LBT) type to be used in association with the uplink resource partition; a LBT unit to perform the LBT type indicated in the DCI; and a transmitter to transmit the UCI on the uplink resource partition.

Example 45

The UE of example 44, wherein the UCI is hybrid automatic repeat request (HARQ) feedback corresponding to a downlink transport block (TB) that is scheduled by the DCI.

Example 46

The UE of example 44 or 45, wherein the DCI indicates a CP extension to a first OFDM symbol of an uplink transmission on the uplink resource partition and to be applied immediately before transmitting the first OFDM symbol of the uplink transmission on the uplink resource partition.

Example 47

The UE of example 46, wherein the UE is to use the CP extension indicated in the DCI to create a gap of a specific duration from an end of a preceding downlink transmission by a base station to a beginning of the uplink transmission on the uplink resource partition.

Example 48

The UE of example 47, wherein the specific duration of the gap is 25 μs or 16 μs, and the UE is configured to perform LBT type 2.

Example 49

The UE of example 47 or 48, wherein the UE is to calculate a duration of the CP extension based on a time alignment (TA) value and a subcarrier spacing (SCS).

Example 50

The UE of example 49, wherein the duration of the CP extension does not exceed one OFDM symbol duration.

Example 51

The UE of any one of examples 44 to 50, wherein the DCI indicates LBT type 1, and wherein the UE is to perform LBT type 2 instead of LBT type 1 in response to receiving a slot format indication (SFI) indicating uplink resources within a base station's channel occupancy, and in response to determining that the indicated uplink resource partition is within the indicated uplink resources.

Example 52

The UE of any one of examples 44 to 51, wherein the DCI indicates that LBT type 1 is to be used in association with the uplink resource partition by the absence of an indication, in the DCI, that LBT type 2 is to be used in association with the uplink resource partition.

Example 53

The UE of any one of examples 44 to 52, wherein the uplink resource partition is a particular uplink resource partition, wherein the DCI indicates a plurality of uplink resource partitions on which the UCI may be sent, the plurality of uplink resource partitions including the particular uplink resource partition, and wherein the LBT unit is to perform a respective LBT type for each of the plurality of uplink resource partitions, wherein the LBT type to be performed for the particular uplink resource partition is the LBT type indicated in the DCI.

Example 54

The UE of example 53, wherein each uplink resource partition of the plurality of uplink resource partitions is on a respective different component carrier in the unlicensed spectrum.

Example 55

The UE of example 53 or 54, wherein the LBT type to be performed for one of the plurality of uplink resource partitions is different from the LBT type to be performed for another one of the plurality of uplink resource partitions.

CONCLUSION

Embodiments are disclosed in which multiple uplink resource partitions are allocated across different CCs, i.e. across different cells, and the UCI may possibly be sent on one or more of the allocated uplink resource partitions. In some embodiments:
(1) A UE is configured with a group of CCs (cells), including SCells in the unlicensed spectrum. The base station uses higher-layer signaling to pre-configure the UE with a number of PUCCH resource sets, e.g. per uplink BWP, for each cell of some or all of the cells in the active cell group.
(2) The base station then dynamically indicates to the UE multiple PUCCH resources across multiple cells, including SCells, selected within the active cell group.
(3) The base station uses a cross-carrier PUCCH indication bitmap to indicate the selected subset of cells to the UE.
(4) Either the legacy PUCCH resource indicator field is mapped to the indicated cells or an extended multi-PUCCH resource indicator bitmap may be used, as described above.

Possible technical benefits of some embodiments include:
(1) PUCCH resources are pre-configured and made available on SCells for the base station to provide more frequency-domain opportunities for the UE to transmit critical UCI in an LBT-resilient manner, even if wideband carriers/UL BWPs are not configured; and/or
(2) Relatively compact indication in DCI, with options exploiting the tradeoff between signaling overhead and flexible resource allocation; and/or
(3) Improved resource utilization by reducing the potential resource waste due to allocation of multiple PUCCH resources per UE; and/or
(4) Reduction of collisions between different UEs.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method performed by a user equipment (UE), the method comprising:
receiving a downlink control information (DCI) indicating a plurality of uplink control channel resource partitions on which an uplink control information (UCI) transmission can be transmitted, each uplink control channel resource partition of the plurality of uplink control channel resource partitions being in a bandwidth part of a respective different serving cell configured to the UE,
wherein a first serving cell respective to a first uplink control channel resource partition of the plurality of uplink control channel resource partitions is on a first frequency component carrier in an operating spectrum, and a second serving cell respective to a second uplink control channel resource partition of the plurality of uplink control channel resource partitions is on a second frequency component carrier of the operating spectrum,
wherein the operating spectrum is an unlicensed shared spectrum, and wherein the first frequency component carrier of the first serving cell and the second frequency component carrier of the second serving cell are different frequency component carriers in the unlicensed shared spectrum, and wherein the first uplink control channel resource partition and the second uplink control channel resource partition do not overlap with each other in frequency domain,
wherein the DCI includes a bitmap indicating particular frequency component carriers to which the plurality of uplink control channel resource partitions are allocated, wherein the particular frequency component carriers are selected from a larger set of frequency component carriers, wherein a respective different uplink control channel resource partition of the plurality of uplink control channel resource partitions is allocated to each frequency component carrier of the particular frequency component carriers, and wherein indicating the plurality of the plurality of uplink control channel resource partitions comprises the DCI indicating a resource index of a time-frequency control channel resource partition on which the uplink UCI transmission can be transmitted for each frequency component carrier of the particular frequency component carriers; and
transmitting the uplink UCI transmission on at least one of the plurality of uplink control channel resource partitions.

2. The method of claim 1, wherein the first frequency component carrier of the first serving cell and the second frequency component carrier of the second serving cell are a same frequency component carrier in the operating spectrum, and wherein at least the uplink UCI transmission on the first uplink control channel resource partition and the uplink UCI transmission on the second uplink control channel resource partition do not overlap with each other in time domain.

3. The method of claim 1, wherein the DCI further indicates a listen-before-talk (LBT) type associated with transmitting the UCI on the at least one of the plurality of uplink control channel resource partitions, and the method further comprising:
performing a respective LBT type for each uplink control channel resource partition of the plurality of uplink control channel resource partitions,
wherein the performing the respective LBT type for each uplink control channel resource partition comprises listening to a wireless channel in a frequency region of the uplink control channel resource partition to determine whether the wireless channel is idle in the frequency region of the uplink control channel resource partition.

4. The method of claim 3, wherein the respective LBT type the UE performs for the first uplink control channel resource partition is the LBT type indicated in the DCI, and wherein the respective LBT type the UE performs to listen to the wireless channel in the frequency region of the second uplink control channel resource partition is different from the LBT type indicated in the DCI.

5. The method of claim 4, wherein the DCI indicates LBT type 1, and wherein the performing the LBT type indicated in the DCI comprises:
performing LBT type 2 instead of LBT type 1 in response to receiving a slot format indication (SFI) indicating uplink resources within a base station's channel occupancy, and in response to determining that an uplink control channel resource partition indicated in the DCI is within the uplink resources indicated in the SFI.

6. The method of claim 3, wherein the DCI further indicates a cyclic prefix (CP) extension for an uplink transmission on the uplink control channel resource partition to a first orthogonal frequency division multiplexing (OFDM) symbol of the uplink UCI transmission on the at least one of the plurality of uplink control channel resource partitions and applied immediately before transmitting the first OFDM symbol of the uplink UCI transmission on the at least one of the plurality of uplink control channel resource partitions.

7. The method of claim 6, wherein the DCI indicates to the UE to use the CP extension indicated in the DCI to create a gap of a specific duration from an end of a preceding downlink transmission by a base station to a beginning of the uplink UCI transmission on the at least one of the plurality of uplink control channel resource partitions, wherein the specific duration of the gap is 25 μs or 16 μs and the UE performs LBT type 2, the method further comprising:
calculating a duration of the CP extension based on a time alignment (TA) value and a subcarrier spacing (SCS) such that the duration of the CP extension does not exceed one OFDM symbol duration.

8. The method of claim 1, wherein a same resource index indication is used to indicate a respective uplink control channel resource partition on which the uplink UCI transmission may be transmitted for each frequency component carrier of the particular frequency component carriers.

9. The method of claim 1, wherein the bitmap is a first bitmap, and wherein the DCI further includes a second bitmap having a plurality of fields, each field corresponding to a respective frequency component carrier of the particular frequency component carriers, and each field indicating the respective uplink control channel resource partition on which the uplink UCI transmission may be transmitted on the respective frequency component carrier.

10. The method of claim 1, further comprising:
before the receiving the DCI, receiving higher layer signaling indicating preconfigured uplink control channel resource partitions, the plurality of uplink control channel resource partitions being a subset of the preconfigured uplink control channel resource partitions.

11. A user equipment (UE), comprising:
at least one processor; and
a non-transient memory for storing instructions that when executed by the at least one processor cause the UE to be configured to:
receive a downlink control information (DCI) indicating a plurality of uplink control channel resource partitions on which an uplink control information (UCI) transmission can be transmitted, each uplink control channel resource partition of the plurality of uplink control channel resource partitions being in a bandwidth part of a respective different serving cell configured to the UE,
wherein a first serving cell respective to a first uplink control channel resource partition of the plurality of uplink control channel resource partitions is on a first frequency component carrier in an operating spectrum, and a second serving cell respective to a second uplink control channel resource partition of the plurality of uplink control channel resource partitions is on a second frequency component carrier of the operating spectrum,
wherein the operating spectrum is an unlicensed shared spectrum, and wherein the first frequency component carrier of the first serving cell and the second frequency component carrier of the second serving cell are different frequency component carriers in the unlicensed shared spectrum, and wherein the first uplink control channel resource partition and the second uplink control channel resource partition do not overlap with each other in frequency domain,
wherein the DCI includes a bitmap indicating particular frequency component carriers to which the plurality of uplink control channel resource partitions are allocated, wherein the particular frequency component carriers are selected from a larger set of frequency component carriers, wherein a respective different uplink control channel resource partition of the plurality of uplink control channel resource partitions is allocated to each frequency component carrier of the particular frequency component carriers, and wherein indicating the plurality of the plurality of uplink control channel resource partitions comprises the DCI indicating a resource index of a time-frequency control channel resource partition on which the uplink UCI transmission can be transmitted for each frequency component carrier of the particular frequency component carriers; and
transmit the uplink UCI transmission on at least one of the plurality of uplink control channel resource partitions.

12. The UE of claim 11, wherein the first frequency component carrier of the first serving cell and the second frequency component carrier of the second serving cell are a same frequency component carrier in the operating spectrum, and wherein at least the uplink UCI transmission on the first uplink control channel resource partition and the uplink UCI transmission on the second uplink control channel resource partition do not overlap with each other in time domain.

13. The UE of claim 11, wherein the DCI further indicates a listen-before-talk (LBT) type associated with transmitting the UCI on the at least one of the plurality of uplink control channel resource partitions, and the instructions that when executed by the at least one processor further cause the UE to be configured to:

perform a respective LBT type for each uplink control channel resource partition of the plurality of uplink control channel resource partitions, wherein performing the respective LBT type for each uplink control channel resource partition comprises listening to a wireless channel in a frequency region of the uplink control channel resource partition to determine whether the wireless channel is idle in the frequency region of the uplink control channel resource partition.

14. The UE of claim 13, wherein the respective LBT type the UE performs for the first uplink control channel resource partition is the LBT type indicated in the DCI, and wherein the respective LBT type the UE performs to listen to the wireless channel in the frequency region of the second uplink control channel resource partition is different from the LBT type indicated in the DCI.

15. A method performed by a base station, the method comprising:

sending to a user equipment (UE) a downlink control information (DCI) indicating a plurality of uplink control channel resource partitions on which an uplink control information (UCI) transmission can be transmitted, each uplink control channel resource partition of the plurality of uplink control channel resource partitions being in a bandwidth part of a respective different serving cell configured to the UE, wherein a first serving cell respective to a first uplink control channel resource partition of the plurality of uplink control channel resource partitions is on a first frequency component carrier in an operating spectrum, and a second serving cell respective to a second uplink control channel resource partition of the plurality of uplink control channel resource partitions is on a second frequency component carrier of the operating spectrum, wherein the operating spectrum is an unlicensed shared spectrum, and wherein the first frequency component carrier of the first serving cell and the second frequency component carrier of the second serving cell are different frequency component carriers in the unlicensed shared spectrum, and wherein the first uplink control channel resource partition and the second uplink control channel resource partition do not overlap with each other in frequency domain, wherein the DCI includes a bitmap indicating particular frequency component carriers to which the plurality of uplink control channel resource partitions are allocated, wherein the particular frequency component carriers are selected from a larger set of frequency component carriers, wherein a respective different uplink control channel resource partition of the plurality of uplink control channel resource partitions is allocated to each frequency component carrier of the particular frequency component carriers, and wherein indicating the plurality of the plurality of uplink control channel resource partitions comprises the DCI indicating a resource index of a time-frequency control channel resource partition on which the uplink UCI transmission can be transmitted for each frequency component carrier of the particular frequency component carriers; and receiving the uplink UCI transmission on at least one of the plurality of uplink control channel resource partitions.

16. The method of claim 15, wherein the first frequency component carrier of the first serving cell and the second frequency component carrier of the second serving cell are a same frequency component carrier in the operating spectrum, and wherein at least the uplink UCI transmission on the first uplink control channel resource partition and the uplink UCI transmission on the second uplink control channel resource partition do not overlap with each other in time domain.

17. The method of claim 15, wherein the DCI further indicates a listen-before-talk (LBT) type associated with transmitting the UCI on the at least one of the plurality of uplink control channel resource partitions.

18. The method of claim 17, wherein the DCI further indicates a cyclic prefix (CP) extension for an uplink transmission on an uplink control channel resource partition to a first orthogonal frequency division multiplexing (OFDM) symbol of the uplink UCI transmission on the at least one of the plurality of uplink control channel resource partitions.

19. The method of claim 15, wherein a same resource index indication is used to indicate a respective uplink control channel resource partition on which the uplink UCI transmission may be transmitted for each frequency component carrier of the particular frequency component carriers.

20. The method of claim 15, wherein the bitmap is a first bitmap, and wherein the DCI further includes a second bitmap having a plurality of fields, each field corresponding to a respective frequency component carrier of the particular frequency component carriers, and each field indicating the respective uplink control channel resource partition on which the uplink UCI transmission may be transmitted on the respective frequency component carrier.

21. A base station, comprising:
at least one processor; and
a non-transient memory for storing instructions that when executed by the at least one processor cause the base station to be configured to:

send to a user equipment (UE) a downlink control information (DCI) indicating a plurality of uplink control channel resource partitions on which an uplink control information (UCI) transmission can be transmitted, each uplink control channel resource partition of the plurality of uplink control channel resource partitions being in a bandwidth part of a respective different serving cell configured to the UE, wherein a first serving cell respective to a first uplink control channel resource partition of the plurality of uplink control channel resource partitions is on a first frequency component carrier in an operating spectrum, and a second serving cell respective to a second uplink control channel resource partition of the plurality of uplink control channel resource partitions is on a second frequency component carrier of the operating spectrum, wherein the operating spectrum is an unlicensed shared spectrum, and wherein the first frequency component carrier of the first serving cell and the second frequency component carrier of the second serving cell are different frequency component carriers in the unlicensed shared spectrum, and wherein the first uplink control channel resource partition and the second uplink control channel resource partition do not overlap with each other in frequency domain, wherein the DCI includes a bitmap indicating particular frequency component carriers to which the plurality of uplink control channel resource partitions are allocated, wherein the particular frequency component carriers are selected from a larger set of frequency component carriers, wherein a respective different uplink control channel resource partition of the plurality of uplink control channel resource partitions is allocated to each frequency component carrier of the particular frequency component carriers, and wherein indicating the plurality of the plurality of uplink control channel resource partitions comprises the DCI indicating a resource index of a time-frequency control channel resource partition on which the uplink UCI transmission can be transmitted for each frequency component carrier of the particular frequency component carriers; and receive the uplink UCI transmission on at least one of the plurality of uplink control channel resource partitions.

22. The base station of claim 21, wherein the first frequency component carrier of the first serving cell and the second frequency component carrier of the second serving cell are a same frequency component carrier in the operating spectrum, and wherein at least the uplink UCI transmission on the first uplink control channel resource partition and the uplink UCI transmission on the second uplink control channel resource partition do not overlap with each other in time domain.

23. The base station of claim 21, wherein the DCI further indicates a listen-before-talk (LBT) type associated with transmitting the UCI on the at least one of the plurality of uplink control channel resource partitions.

24. The base station of claim 23, wherein the DCI further indicates a cyclic prefix (CP) extension for an uplink transmission on an uplink control channel resource partition to a first orthogonal frequency division multiplexing (OFDM) symbol of the uplink UCI transmission on the at least one of the plurality of uplink control channel resource partitions.

* * * * *